United States Patent [19]
Bertone et al.

[11] Patent Number: 6,125,436
[45] Date of Patent: *Sep. 26, 2000

[54] SYMMETRIC MULTIPROCESSING SYSTEM WITH UNIFIED ENVIRONMENT AND DISTRIBUTED SYSTEM FUNCTIONS WHEREIN BUS OPERATIONS RELATED STORAGE SPACES ARE MAPPED INTO A SINGLE SYSTEM ADDRESS SPACE

[75] Inventors: James F. Bertone, Quincy; Bruno DiPlacido, Jr., Dedham; Thomas F. Joyce, Westford; Martin Massucci, Burlington; Lance J. McNally, Townsend, all of Mass.; Thomas L. Murray, Jr., Hollis, N.H.; Chester M. Nibby, Jr., Beverly, Mass.; Michelle A. Pence, Chelmsford, Mass.; Marc Sanfacon, North Chelmsford, Mass.; Jian-Kuo Shen, Belmont, Mass.; Jeffrey S. Somers, Lowell, Mass.; G. Lewis Steiner, Milford, Mass.

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/855,810
[22] Filed: May 12, 1997

Related U.S. Application Data

[60] Continuation of application No. 08/405,520, Mar. 16, 1995, abandoned, which is a division of application No. 08/258,752, Jun. 10, 1994, abandoned, which is a continuation of application No. 08/056,708, Apr. 30, 1993, abandoned.

[51] Int. Cl.$^7$ ............................................. G06F 12/00
[52] U.S. Cl. ................................... 711/202; 711/200
[58] Field of Search ................................... 711/202, 203, 711/206, 209, 207, 208, 200

[56] References Cited

U.S. PATENT DOCUMENTS

| | | | |
|---|---|---|---|
| 4,449,183 | 5/1984 | Flahive et al. | 395/478 |
| 4,602,368 | 7/1986 | Circello et al. | 371/21 |
| 4,868,738 | 9/1989 | Kish et al. | 395/846 |
| 5,404,485 | 4/1995 | Ban | 364/246.3 |
| 5,418,967 | 5/1995 | Simcoe et al. | 395/729 |
| 5,475,850 | 12/1995 | Kahn | 395/293 |
| 5,485,586 | 1/1996 | Brash et al. | 395/293 |
| 5,517,648 | 5/1996 | Bertone et al. | 395/732 |
| 5,522,069 | 5/1996 | Bertone et al. | 395/650 |
| 5,555,382 | 9/1996 | Thaller et al. | 395/293 |
| 5,634,007 | 5/1997 | Calta et al. | 711/164 |

*Primary Examiner*—Ario Etienne
*Attorney, Agent, or Firm*—Katten Muchin Zavis

[57] ABSTRACT

A symmetric multiprocessing system with a unified environment and distributed system functions provides unified address space for all functional units in the system while distributing the execution of various system functions over the functional units of the system whereby each functional unit assumes responsibility for its own aspects of these operations. In addition, the system provides improved system bus operation for transfer of data from memory.

8 Claims, 25 Drawing Sheets

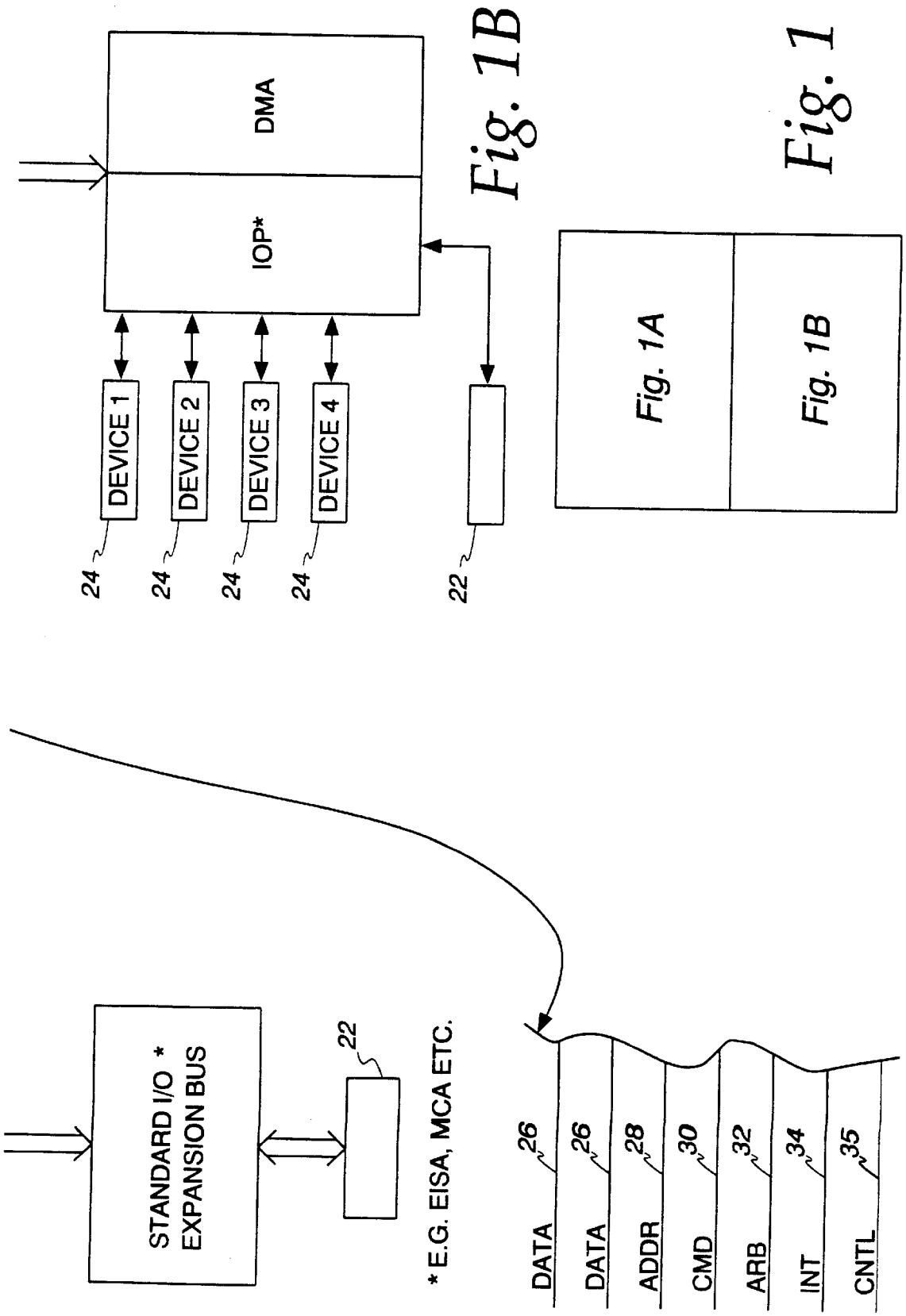

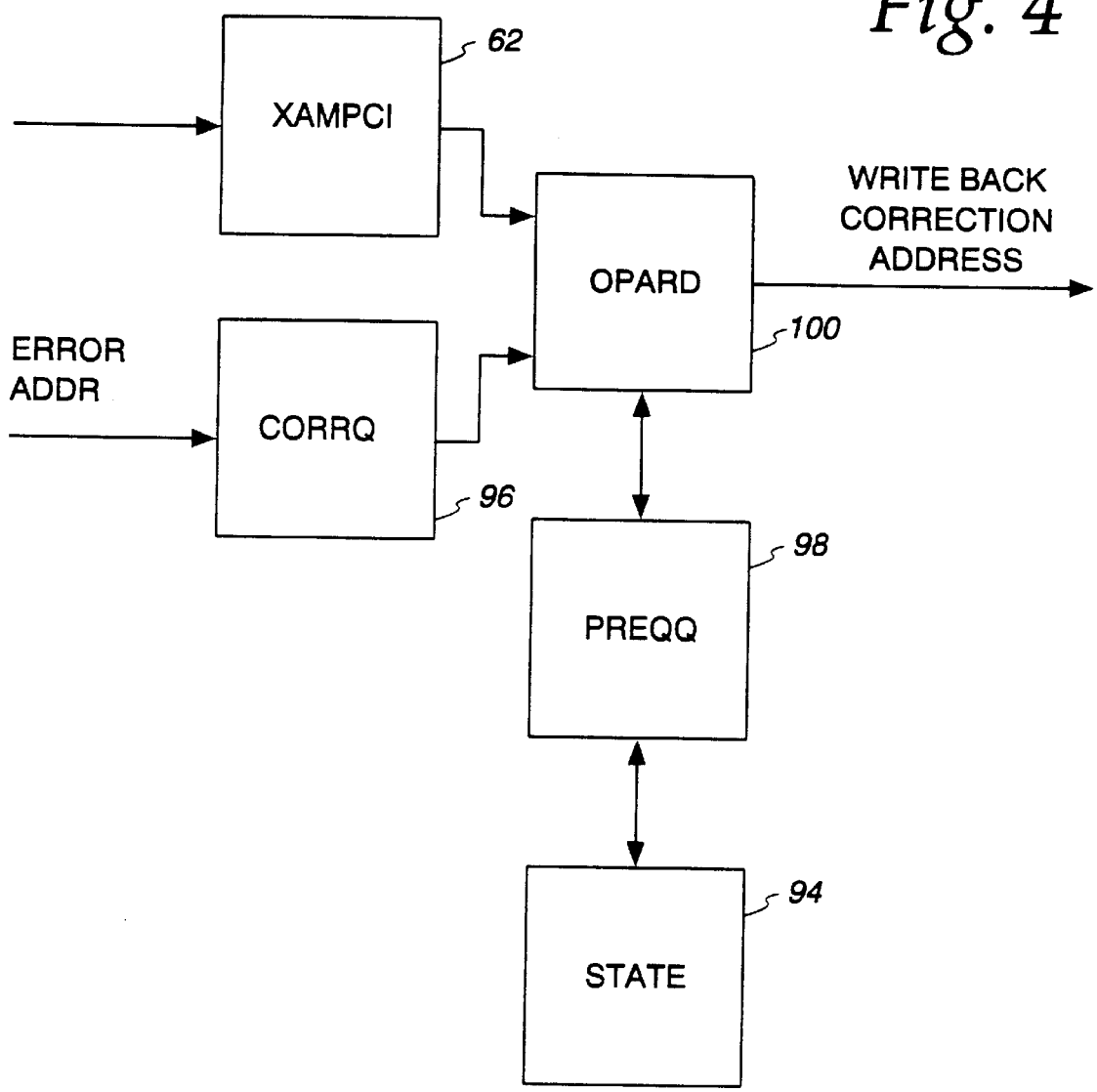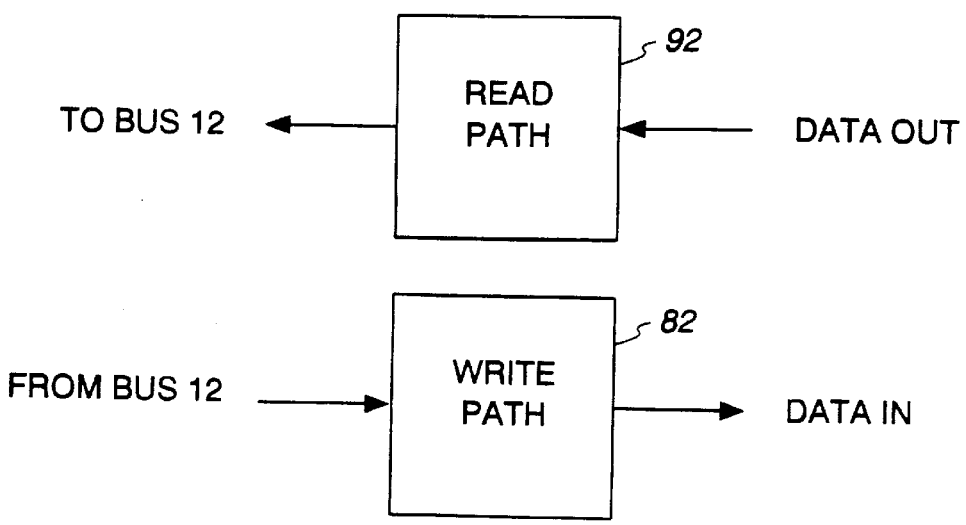
Fig. 4

SYMMETRIC MULTIPROCESSING SYSTEM WITH UNIFIED ENVIRONMENT AND DISTRIBUTED SYSTEM FUNCTIONS WHEREIN BUS OPERATIONS RELATED STORAGE SPACES ARE MAPPED INTO A SINGLE SYSTEM ADDRESS SPACE

CROSS REFERENCES TO RELATED APPLICATIONS

This application is a continuation of U.S. patent application Ser. No. 08/405,520 filed Mar. 16, 1995, now abandoned.

This application is a division of patent application Ser. No. 08/258,752, filed Jun. 10, 1994, which is a Continuation of patent application Ser. No. 08/056,708, filed Apr. 30, 1993 now abandoned.

BACKGROUND OF THE INVENTION

1. Field of the Invention

The present invention relates to an improved data processing system and, in particular, to a symmetric data processing system with unified process environment and distributed system functions.

2. Discussion of the Prior Art

A recurring problem in symmetric multiprocessing systems of the prior art, that is, in systems having a plurality of processes wherein any of a plurality of multi-threaded processes may be executed concurrently or in any sequence on any of a plurality of processors, is in providing an environment which is unified from the viewpoint of the processes executing therein but wherein the system functions, such as memory space management, bus access, and data management, are not concentrated in a single processor. Such concentration of system functions, usually resulting from an attempt to present a unified processing environment, presents fundamental limitations in the capabilities of the centralized facility for performing such functions have an upper limit. The use of centralized system functions frequently results in a non-unified environment in that a centralized system cannot handle or even be aware of the requirements of each functional unit in the system.

SUMMARY OF THE INVENTION

The system of the present invention provides a solution to these and other problems of the prior art by providing a system having a unified address space for all functional units in the system while distributing the execution of such system functions as management of address space, management of data and encached data, and arbitration of system bus access over the functional units of the system whereby each functional unit assumes responsibility for its own aspects of these operations.

The system of the present invention further provides an improved system bus operation for transfer of data from memory, memory having adaptive timing dependent upon such factors as the specific memory circuits and bus transfer rates, an improved input/output structure with caching of I/O operations, and an improved means for tracking data status.

Other features, objects and advantages of the present invention will be understood by those of ordinary skill in the art after reading the following descriptions of the present invention, and after examining the drawings, wherein:

BRIEF DESCRIPTION OF THE DRAWINGS

FIGS. 1A and 1B is a block diagram of a system incorporating the present invention;

FIG. 4 is a block diagram of a correction queue;

DESCRIPTION OF A PREFERRED EMBODIMENT

A. Introduction

The following will present a detailed description of a system implementing a presently preferred embodiment of the present invention, starting with a brief summary overview of the system and progressing to detailed descriptions of each of the major functional units of the system. Each description of a major functional unit of the system will, in turn, begin with a block diagram level description of the functional unit, including descriptions of the interstructural and interoperational relationships of the functional unit with other functional units of the system. The block diagram level discussion of a functional unit will be followed by further discussions of certain selected functions and operations of the functional unit. Further very detailed descriptions of each functional are provided in which will describe the inputs/outputs, external and internal interfaces, timing and detailed circuitry, operations and functions of the functional units. The detailed descriptions are included herein in the form of Appendices for convenience because of the extent of these very detailed descriptions.

The Appendices included within this description include:

Appendix 1—XA-MP Bus;

Appendix 2—Memory Controller;

Appendix 3—Memory Data Path;

Appendix 4—Adaptive Memory Timing State Machine;

Appendix 5—Arbitration Logic—A;

Appendix 6—Memory Bus Controller;

Appendix 7—Processor Data Path;

Appendix 8—Snoop Control;

Appendix 9—Bus Interface Controller;

Appendix 10—Arbitration Logic—B; and,

Appendix 11—Arbitration Logic—C.

Each description will be accompanied by drawings to illustrate the corresponding portion of the description, but it should be noted that each drawing will focus particularly on the corresponding description and a given drawing may not show all elements of the functional unit, although all significant elements of each functional unit will be illustrated in a drawing related to the description of the functional unit.

1. Description of a System 10

Figure 1A:
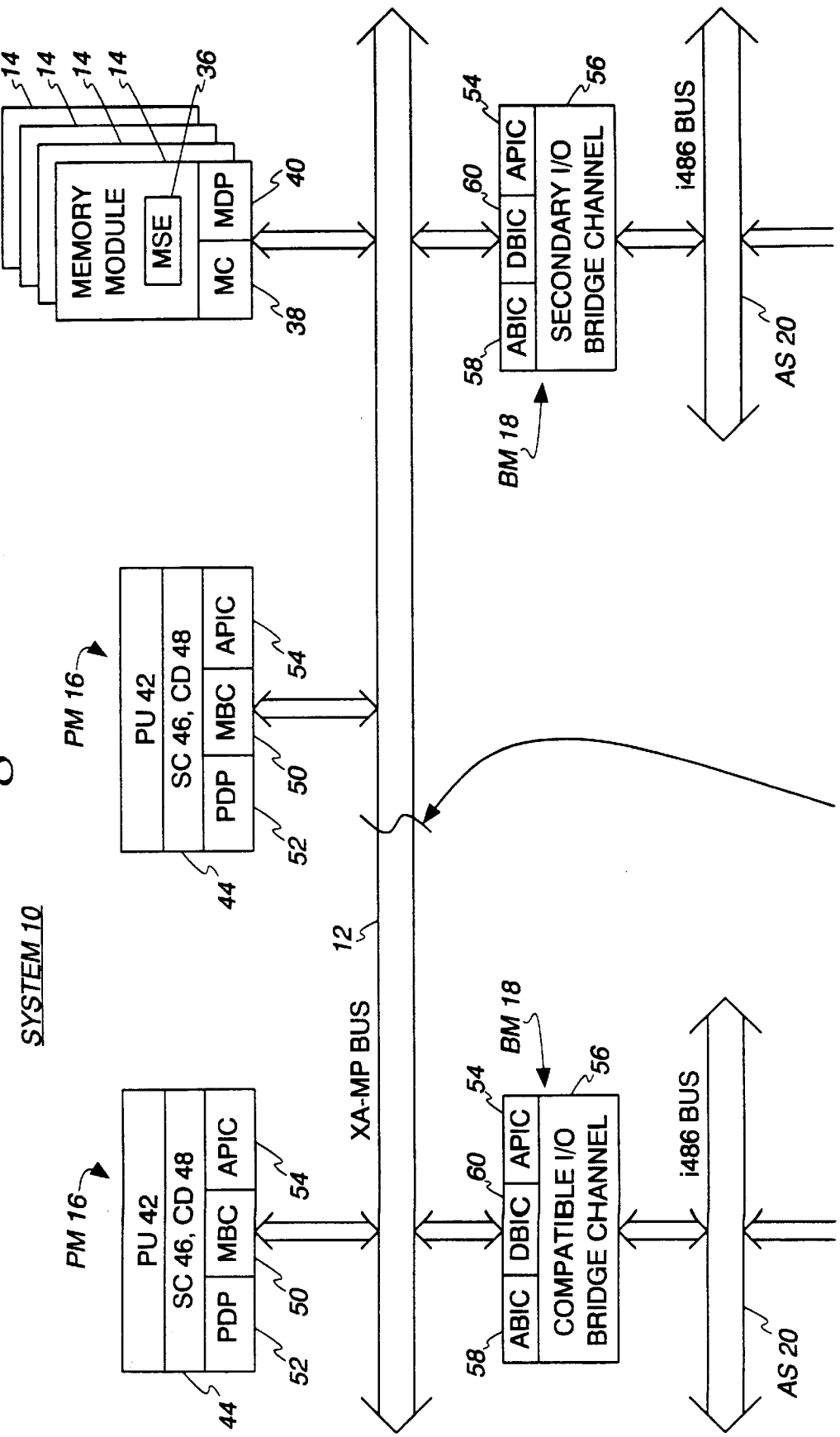

Referring to FIGS. 1A and 1B, therein is represented a general block diagram of a symmetric multi-processing System 10 incorporating and implementing the present invention. As indicated therein, System 10 includes an Extended Architecture-Multiple Processor (XA-MP) Bus 12 which interconnects a plurality of system functional units. The system functional units include one or more Memory Modules (MMs) 14 for storing data and programs for controlling operations of the system and operations on the data, one or more Processor Modules (PMs) 16 responsive to the instructions of the programs for performing the operations directed by the programs, and one or more Bridge Modules (BMs) 18 for interconnecting XA-MP Bus 12 and the system functional units with other Alternate System (AS) Buses 20 connecting to other elements of the system. AS Buses 20 may include, for example, the Intel i486 bus and EISA and MCA buses. AS Buses 20 may in turn interconnect to other System Elements 22, such as processing elements and memories, for example, microprocessors such as Intel i486 microprocessors, and devices such as input/output (I/O) Devices 24, which may include disk drives, keyboards, communications controllers, and visual display generators such as graphics adapters.

As indicated in FIG. 1 and as will be discussed in the following, XA-MP Bus 12 is comprised of either one or two Data Buses 26 for transporting data, an Address (ADDR) Bus 28 for transporting memory and I/O space addresses and slice information and a Command (CMD) Bus 30 for transporting commands indicating bus related operations to be performed by the system units connected from XA-MP Bus 12. Also associated with XA-MP Bus 12 is a plurality of Arbitration (ARB) Lines 32 which are used by the system functional units to arbitrate among themselves for access to XA-MP Bus 12, as well as for other operations described in the following, Interrupt (INT) Lines 34 which are used in interrupt operations, and a number of control lines (CNTL) 35 which will be discussed as necessary in the following. It should be noted that all lines of XA-MP Bus 12 and all control lines associated with XA-MP Bus 12 are registered, or latched, at both ends and that all bus operations are executed with respect to only latched data and signals.

As will also be discussed, the Data Buses 26 of XA-MP Bus 12 are operationally separate from and independent from the ADDR 28 and CMD 30 Buses of XA-MP Bus 12 and the primary mode of information transfer over XA-MP Bus 12, that is, for reads from MMs 14, is in the form of ordered transfers. In addition, the two Data Buses 26 are operationally independent from each other and each may execute a transfer independently of the other.

In ordered transfers, each functional unit tracks its own memory requests through operation of an ordered request queue in each functional unit, and the usual sequence of handshaking operations between an information requester and an information provided is eliminated, thereby enhancing the speed with which memory reads may be performed. XA-MP Bus 12 is also capable of operating in an out-of-order mode wherein the operations of Data Buses 26 are coupled with the operations of ADDR 28 and CMD 30 Buses to perform out-of-order transfers requiring handshaking between the requester and the provider.

Each system functional unit connected to XA-MP Bus 12 is comprised of a set of operational elements for performing the operations to be performed by the corresponding type of functional unit. These operational elements will include a bus interface control unit connected to the ADDR Bus 28 and CMD Bus 30 of XA-MP Bus 12 for controlling operations of the functional unit with respect to XA-MP Bus 12 and a two bus interface data path units, each connected to one of the Data Buses 26, for transporting data between the functional unit's operational elements and XA-MP Bus 12. In alternate implementations of System 10, XA-MP Bus 12 may include, or may use, only a single Data Bus 26 and the functional units will accordingly include, or use, only a single data path connecting to the single Data Bus 26.

In the instance of a MM 14, for example, the operational elements are comprised of Memory Storage Elements (MSE) 36 which, for example, may be comprised of column and row arrays dynamic random access memories (DRAMs) constructed as Single In-Line Memory Modules (SIMM) integrated circuits such as are commonly used for such memories. The memory bus interface control unit is comprised of Memory Controller (MC) 38 while the memory data path unit is comprised of a pair of Memory Data Paths (MDPs) 40, one connected to each Data Bus 26. In the instance of an implementation wherein XA-MP Bus 12 includes a single Data Bus 26, an MM 14 will correspondingly include a single MDP 40.

In the case of a PM 16, the operational elements are comprised of one or more Processor Units 42, each of which may have an internal, primary cache and an associated Cache Mechanism (CM) 44, each of which may in turn be comprised of a Secondary Cache (SC) 46 and a Cache Directory and Controller (CD) 48. There is a PM 16 bus interface control unit for each Processor Unit 42, represented as an Memory Bus Controller (MBC) 50, and a data path unit comprised of one or more Processor Data Paths (PDPs) 52 for each Processor Unit 42, the number of PDPs 52 associated with each Processor Unit 42 again depending upon the number of Data Buses 26 in XA-MP Bus 12. As indicated, each PM 16 further includes one or more Advanced Processor Interrupt Controllers (APICs) 54 connected from INT Lines 34 for handling interrupt operations for the Processor Units 42.

Finally, in the instance of a BM 18, the Operational Elements (OEs) 56 are dependent upon the type of operations that the BM 18 is to support and may, for example, comprise a set of bus interface logic for interfacing with various types of AS Bus 20 or operational elements for specific purposes. In a BM 18, the bus interface control unit is comprised of one or more Advanced Bus Interface Controllers (ABICs) 58, which perform essentially the same type of functions as MBCs 50. There is a bus interface data unit associated with each bus interface control unit and each bus interface data unit is comprised of one or more Data Bus Interface Controllers (DBICs) 60, again dependent upon the number of Data Buses 26, which form essentially the same type of functions as PDPs 52 and MDPs 40. In addition, the DBIC 60 has an internal data cache. Each BM 18 will also include an APIC 54 to handle interrupt operations.

2. Summary of Certain System 10 Architectural Features

As described above, System 10 is a symmetric multiprocessing system wherein processes may be executed in any of a plurality of Processing Units 42 under the control of programs stored in Memory Modules 14. As will be summarized below, and as will be described in detail in following portions of the present description, the system presents a unified operating environment for executing multiple processes concurrently, while many system functions are distributed through the functional units of the system, rather than centralized in a functional unit.

For example, System 10 provides a unified environment by performing all operations within a single address space wherein all data, program and information storage functions of the system occupy that single address space. Such data, program and information storage functions may include, for example, the memory space in MMs 14, the registers of Processor Units 42, and other information storage functions, such as the display memories of video controllers and I/O devices, and the space required to store operating systems and BIOSs, such as the ROM BIOSs commonly used in personal computers.

The management of information storage, however, is generally distributed among the functional units of the system, so that, for example, MMs 14 are responsible for managing the address locations within that address space that are used by MSEs 36 to store data and programs. In a like manner, the PMs 16 are functionally responsible for managing the address space locations occupied by the registers of Processing Units 42 while BMs 18 are responsible for managing the address space locations used by video display controllers and occupied by Read Only Memories and other memories for storing such programs and data as ROM BIOSs.

The management of the single system address space is essentially performed by the mapping of the various storage means, such as the processor registers, the physical memory locations in MMs 14, and such storage as is provided in ROMs for ROM BIOSs and as video memory for video display controllers, into the address space. In System 10, each functional unit is therefore responsible for mapping its associated storage spaces into the single system address space.

To illustrate the distributed management of the system address space, each Processing Unit 42 has a block of registers associated with it for storing control information relating to bus operations. In System 10, however, these registers are addressed as part of the system-wide single address space.

To accomplish this, each processor has a register associated with it for storing a pointer which is essentially an offset address representing the starting address of a first register of the block of registers in the system address space. At system initialization each processing unit, and each functional unit in the system, determines its location, or "slice" number on XA-MP Bus 12, each functional unit being referred to herein as a "slice" in reference to its location on XA-MP Bus 12. As will be described further in a following description of System 10's arbitration mechanism, the slice numbers of the functional units are used to determine the relative priorities of the functional units for XA-MP Bus 12 accesses and are determined at system initialization through operation of the System 10 arbitration mechanism.

The slice numbers are then used to determine the offset pointer values for each block of registers and those values are stored in the associated register for use in addressing the registers of the blocks, with the blocks of registers usually being assigned address space locations high in the address space of the system to avoid conflict with the address space assigned to system memory in the MMs 14.

As will be described certain of this slice number information may be provided to other functional units of the system for use in their mapping of their addressable memory or storage areas into the system address space. For example, the slice numbers are provided from the processing unit functional units to the MMs 14 and are used by the MM 14s, in a manner described in a following discussion of MMs 14, to construct as address translation table for converting system address space addresses into physical address locations of the SIMM memory chips in the memories.

Similar processes are followed for each functional unit having addressable storage or memory space associated with it and related to bus operations, with each functional unit mapping its associated storage or memory space into the system address space. Each functional unit is thereafter responsible for detecting addresses on XA-MP Bus 12 which refer to memory or storage address locations in or associated with that functional unit and responding appropriately.

In a like manner, each functional unit of the system is responsible for management of all information residing in its storage spaces, such as data and program instructions. This aspect of the distributed functionality of the system is particularly significant with respect to cached information as each functional unit, except the MMs 14, is provided with a cache mechanism for storing information which is used by or operated upon by the functional unit. A PM 16, therefore is provided with one or more caches, depending upon the number of Processing Units 42 residing therein, for storing program instructions to control operations of the Processing Units 42 and data to be operated upon by the Processing Units 42. In a similar manner, BMs 18, which are primarily input/output units for System 10, are provided with caches for information being transferred between the functional units connected from XA-MP Bus 12 and buses or devices connected from the BMs 18.

To further illustrate the distribution of system functions among the functional units of the system, it is well known in symmetric multiprocessor systems that a process may execute on any processor of the system and that a process may be assigned to a processor, begin execution, cease execution, for example, by the end of the process's processor time slice, and later resume execution on another processor of the system. In System 10, a process will be assigned to a Processing Unit 42 and will begin execution in the Processing Unit 42 with data and instructions belonging to the process being read from MMs 14 to the cache mechanism associated with the initial Processing Unit 42, so that the data and instructions encached in the cache mechanism then "belong to" the functional unit in which the process is executing, that is, to the Processor 42 and associated cache mechanism. If the process is subsequently "switched" out of the initial Processing Unit 42, as just described, the process' data and instructions which were encached in the initial Processing Unit 42 will remain in residence in the cache mechanism of the initial Processing Unit 42 and will continue to "belong to" the initial Processing Unit 42 unless there is reason, such as lack of cache memory space, for the Processing Unit 42 to transfer the data and instructions back to memory.

If the process then resumes execution on another Processing Unit 42, the process will request the instructions and data required for the process to execute and will, as described in detail below, place a request for the data or instructions on XA-MP Bus 12. The sequence of events that will then be executed will depend upon whether the data originally read from memory had been modified and, as will be described in greater detail in following portions of this description, only one valid copy of data is allowed to exist in System 10 at any time.

If the data originally read from memory to the cache mechanism of the initial Processing Unit 42 had not been modified, and as such had not been marked as modified in the cache mechanism, the valid copy is assumed to be the copy residing in memory and is read from memory to the cache mechanism of the Processor Unit 42 on which the process is now executing. If the data had been modified and is resident in the cache mechanism of the original Processing Unit 42 as marked as modified, then this modified copy of the data is the only valid copy of the data and "belongs to" the original Processing Unit 42. As will be described further in the following, each functional unit of System 10 monitors all read requests appearing on XA-MP Bus 12, in a process referred to as "snooping", and the original Processing Unit 42 will thereby detect the data read request placed on XA-MP Bus 12 by the new Processing Unit 42, as will any other functional unit which contains a "shared" copy of the data.

As described below in the detailed description of XA-MP Bus 12, and other portions of the description of System 10, any functional unit having a copy of requested data will detect a request for the data on XA-MP Bus 12 and may acknowledge the request, which in systems of the prior art would comprise an acknowledgment that the acknowledging unit will respond by providing the requested data. In system 10, however, a functional unit having a modified copy of the data, such as the original Processing Units 42, will assert a Memory Cycle Inhibit (MCI) and CDM command which will cancel the read operation in memory and inform the requesting functional unit that the data will be provided from a source other than the memory. The functional unit having the valid copy of the data, that is, the modified copy of the data will then arbitrate for XA-MP Bus 12 and will provide the modified copy of the data to the new Processing Unit 42 through an out-of-order transfer. The Processing Unit 42 receiving the modified copy of the data from the originally owning Processing Unit 42 becomes the "owner" of the data and assumes responsibility for managing that data at the time of the response.

Other examples of the distribution of system functions among the functional elements of System 10 which will be described in detail in the following include the arbitration of XA-MP Bus 12 access among the functional units, the execution of in-order reads from memory wherein each functional unit requesting a memory read is responsible for tracking its own read requests and detecting and responding to the corresponding memory response, and the adaptive timing of memory operations dependent upon the type of SIMM modules, bus transfer rates, and other factors.

Having described the general structure and operation of a System 10 implementing the present invention, the following will describe the functional units of System 10 in further detail.

B. Detailed Description of a System 10

1. XA-MP Bus 12

Referring again to FIG. 1, XA-MP Bus 12 was described as being comprised of either one or two Data Buses 26 for transporting data, an Address (ADDR) Bus 28 for transporting memory space addresses and a Command (CMD) Bus 30 for transporting commands indicating bus related operations to be performed by the system units connected from XA-MP Bus 14. As also described, a plurality of Arbitration (ARB) Lines 32 are associated with XA-MP Bus 12 and are used by the system functional units to arbitrate among themselves for access to XA-MP Bus 12, as well as for other operations described in the following. Also associated with XA-MP Bus 12 are Interrupt (INT) Lines 34, which are used in interrupt operations and Control (CNTL) Lines 35.

It should be noted for purposes of the following discussions that the primary data element used in System 10 is a block of data, or instructions, referred to as a cache line because information, that is, data or instructions, is encached in System 10's caches in units referred to as lines wherein each line occupies one address location in a cache memory.

Each cache line contains 256 bits, or 32 bytes, of information and each Data Bus 26 is 64 bits, or 8 bytes, wide so that the transfer of one cache line over a Data Bus 26 requires four bus clock cycles for the actual data transfer. In addition, a standard read from memory is comprised of a cache line, that is, a single read request to memory will result in a cache line of 32 bytes being transferred over XA-MP Bus 12 to the requester, thereby requiring four transfers of the bus.

Each XA-MP Bus 12 operation further requires a bus clock cycle, to switch between "bus owners". That is, a single bus clock cycle is required for control of XA-MP Bus 12 to be transferred from a functional unit which is currently using the bus to execute an operation and to a next functional unit which has acquired access to the bus for a next bus operation.

As will be described in the following with respect to MMs 14, the MSEs 36 of each MM 14 are organized as dual columns of address locations, wherein one column contains even address locations and the other column contains odd address locations and wherein each column stores 64 bits of information. MMs 14 are thereby internally organized as half cache lines, with each row across the two columns comprising a half cache line of 128 bits so that a single read operation from a single row across the two columns of SIMM circuits will provide a half cache line of information. The MM 14 to system address space mapping is preferably structured so that consecutive half cache lines are stored in different groups of SIMM circuits so that two consecutive half cache lines may be read from MMs 14 using different memory RAS (Row Address Strobe) signals, and thus different RAS driver circuits, thereby eliminating additional access delay times when using 80 ns SIMMs.

As described above, in the presently preferred embodiment of System 10, XA-MP Bus 12 is provided with two Data Buses 26, each of 64 bits, or one half cache line, in width, to enhance the speed of information transfer over the bus.

As has been described, the two Data Buses 26 operate independently of each other. Either of Data Buses 26 may be used to perform a bus data transfer, such as a read from memory, wherein a bus data transfer will be completely performed upon one or the other of Data Buses 26, so that two bus transfers may be performed concurrently, one on one Data Bus 26 and the other on the other Data Bus 26.

A single, "standard" XA-MP Bus 12 operation, such as a cache line read from memory, thereby requires five bus clock cycles, one for the transmitting functional unit to take control of the bus and four for the transfer of data over one of the two Data Buses 26. It should also be noted, as described in the detailed descriptions of XA-MP Bus 12 and MMs 14, that System 10 may also perform single bus word transfers, and that a transfer may start with either an even or an odd cache line address, that is, is not limited to even-odd-even-odd and so on.

As has been mentioned above, the Data Buses 26 of XA-MP Bus 12 are operationally separate from and independent from the ADDR 28 and CMD 30 Buses of XA-MP Bus 12 and that information transfers over XA-MP Bus 12 for reads from MMs 14, are in the form of ordered transfers wherein the responses to read requests are fulfilled in the order made. In in-order read operations, the responses may occur a number of bus cycles after the request was accepted by the functional unit which accepted the reqeust for response, depending upon whether there were other requests enqueued for response. This type of operation is referred to as "split cycle" operation as the response may be removed in time from the request.

In ordered transfers in System 10, each functional unit tracks its own memory requests independently of other functional unit memory requests, through operation of an ordered request queue in each functional unit. The ordered request queue allows a functional unit to track both its own requests for memory reads and all ordered transfers from the memory, both to itself and to other functional units, and to detect when an in-order transfer from memory is provided in response to one of its requests occurs. A functional unit will then respond accordingly by accepting the data from XA-MP Bus 12. The usual sequence of handshaking operations executed between an information requester and an information provider in conventional buses is thereby eliminated during the response portion of an in-order read cycle.

In the out-of-order mode, the operations of Data Buses 26 is coupled with the operations of ADDR 28 and CMD 30 Buses to perform out-of-order transfers requiring handshaking between the requester and the provider. In such out-of-order transfers, the unit providing the information in response to a request does not necessarily do so in the same sequence in which the requests were placed on XA-MP Bus 12 and the information provider must accordingly note the address, that is, the slice number of the unit making the request. The unit providing the requested information will then, in effect, couple together the operations of a Data Bus 26 with ADDR Bus 28 and CMD Bus 30 by placing the slice number of the requesting unit, that is, the unit which is to receive the information, on ADDR Bus 28 and an appropriate command on CMD Bus 30 while placing the data on a Data Bus 26. The receiving unit will then respond to the slice address and command to accept the data.

As will be described, requests for data reads from memory are placed on XA-MP Bus 12 as ordered requests. If the data is to be provided from a unit other than the memory, as in the previous example wherein information was returned from a cache mechanism of a processor unit rather than from the memory, the unit containing the information will respond by canceling the memory operation, as described, and will respond with an out-of-order response. To do so, the responding unit must obtain the address, or slice number, of the requesting unit and does so by obtaining the slice number of the requesting unit from the bus arbitration mechanism rather than from the requesting unit, so that the requesting unit does not have to provide a self-identifying address with each request. Each information read request may therefore be originally generated by the requesting unit as an ordered request and the requesting unit does not have to know beforehand how the request will be fulfilled.

As described, ordered operations are used for cache line and bus word reads from memory, which comprise the majority of read operations in System 10. Out-of-order operations are used for cache to cache transfers, word transfers, and I/O operations through BMs 18, thereby optimizing the operation of XA-MP Bus 12 for each type of operation.

Further detailed descriptions of the elements, operations, functions and operations of XA-MP Bus 12 may be found in Appendix 1, titled "XA-MP Bus". It should be noted that this appendix, and others, refers to Processing Units 42 as processors "P5", the associated cache mechanisms as a C5C-C8C, and the APICs 54 as Advanced Processor Interrupt Controllers. These designations refer respectively to Intel Pentium processors, the associated primary and secondary cache integrated circuits available from Intel, and the Intel interrupt processor referred to as the Advanced Processor Interrupt Controller. These elements are available from Intel Corporation, as is well known in the art, and are fully described in the Intel technical and product manuals.

2. Memory Modules 14 a. Description of Memory Controller 38

As has been described, each MM 14 is comprised of an MSE 36, which is a row and column array of memory circuits, such as SIMM modules, for addressably storing and providing data as is well known in the art. Each MM 14 further includes an MC 38 providing control functions for the MM 14 and one or more MDPs 40 forming the data paths between the MSE 36 and XA-MP Bus 12, with each MDP 40 connecting to one of the Data Buses 26.

Figure 2:
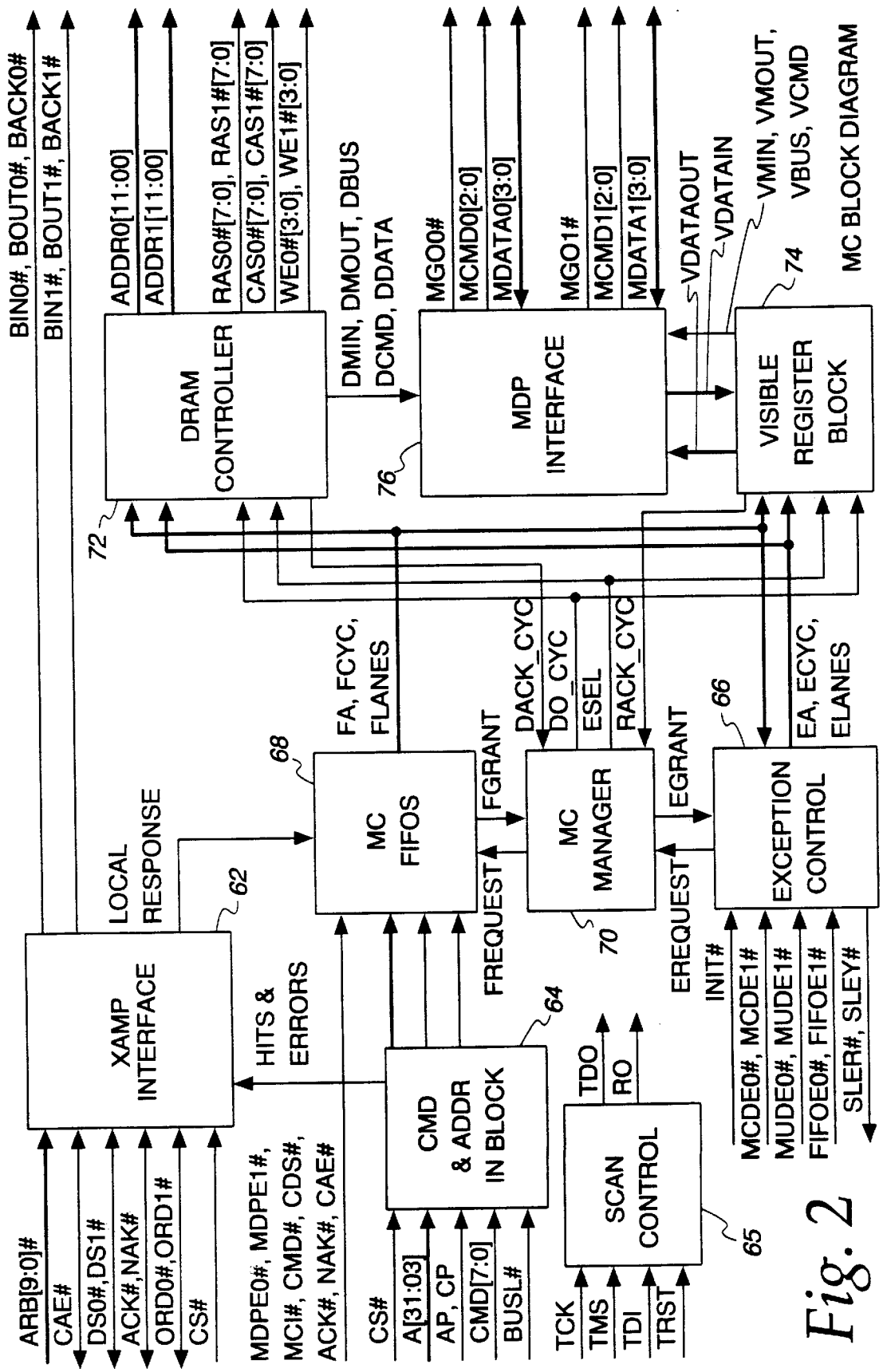
FIG. 2 is a block diagram of a memory controller.
Figure 3:
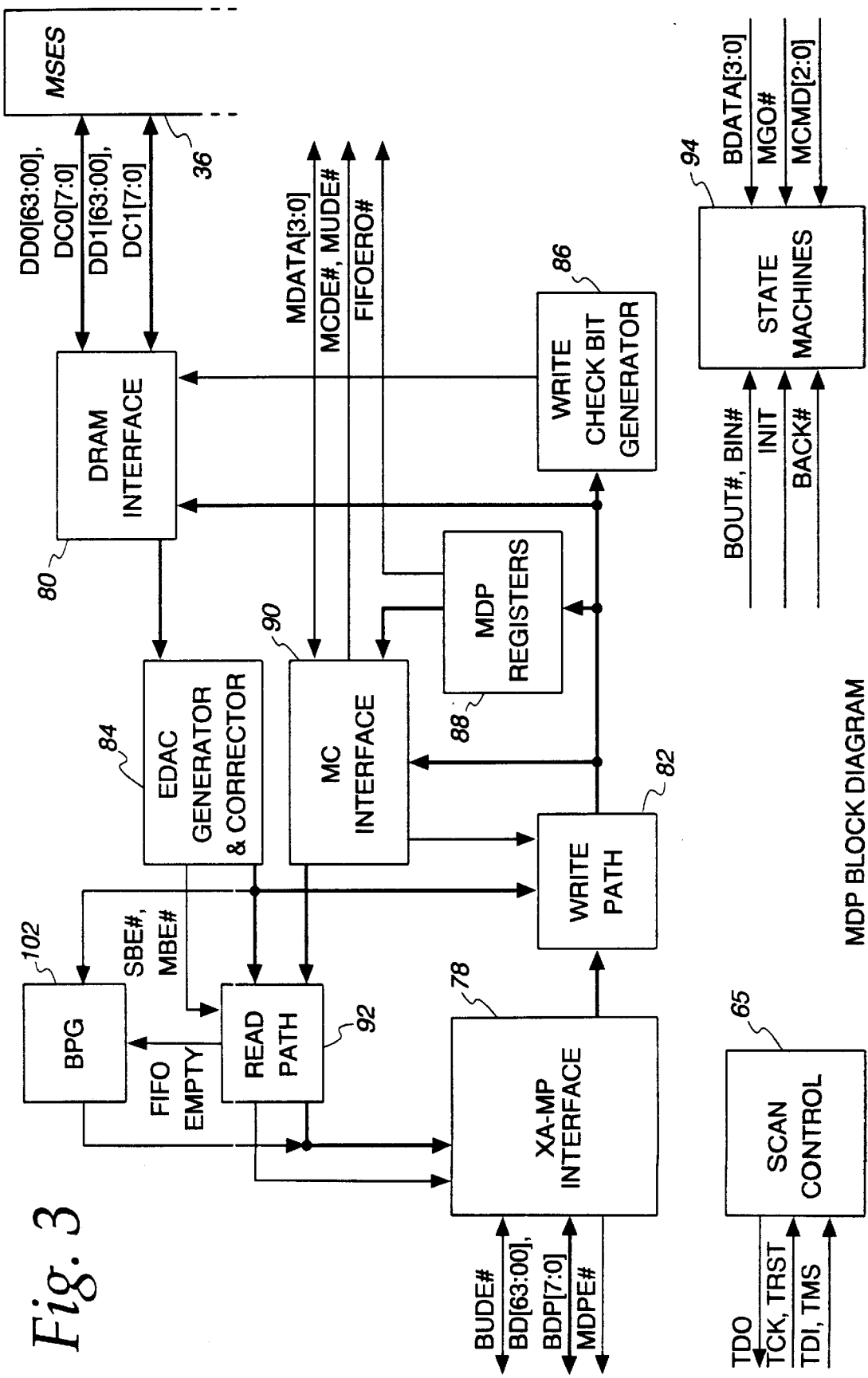
FIG. 3 is a block diagram of a memory data path.

Referring to FIGS. 2 and 3, therein are respectively shown block diagrams of an MC 38 and a MDP 40. Referring first to FIG. 2, the primary interface between an MC 38 and XA-MP Bus 12 and the control lines associated with bus operations is provided by an XAMP Control Interface (XAMPCI) 62 and a Command Address Input Block (CMDAI) 64.

XAMPCI 62 interfaces with certain of the control lines associated with XA-MP Bus 12 operations, which are described in detail in a following detailed description of MC 38. As indicated in FIG. 2, input signals to XAMP Interface 62 from XA-MP Bus 12 include nine ARB signals lines of the system arbitration mechanism (ARB) and a Command Strobe (CS#) indicating the present of a command on CMD 30.

Output signals from XAMPCI 62 include ACK and NAK signals, a CAE# signal indicating that a command or address received by the memory is in error. DS0# and DS1# are individual data strobe signals for the two Data Buses 26 and ORD0# and ORD1# are individual signal for the two Data Buses 26 indicating that an ordered response is present upon the Data Bus 26 corresponding to the ORD# signal.

As indicated, XAMCI 62 provides a Local Response output to a memory command FIFO (First In-First Out Memory), described below, indicating that an operation request has been received that will be responded to by the memory. XAMPCI 62 also provides a number of outputs to MDP 40, including BIN0# and BIN1# which each correspond to one of the Data Buses 26 and are used to enable the transfer of data from the corresponding Data Buses 26 to MDP 40. BOUT0# and BOUT1# each correspond to one of the Data Buses 26 and are signals used to enable the transfer of data from the memory to the corresponding Data Bus 26. BACK0# and BACK1# each correspond to one of the Data Buses 26 and are signals representing to MDP 40 that a write cycles on the corresponding Data Bus 26 is validly acknowledged and not aborted, for example, by MCI.

CMDAI 64 interfaces with ADDR Bus 28 and Command Bus 30 to receive and provide addresses and commands and with other bus operation control lines which are described in detail in a following detailed description of MC 38. Inputs to CMDAI 64 include the addresses appearing on ADDR Bus 28, the command signals (CMD) from CMD Bus 30, and a command strobe signal CS# indicating that a command is present on CMD Bus 30. The (AP) and (CP) inputs are respectively address and command parity bits. Signal BUSL# is a bus control line input indicating that the requesting functional unit has Locked, that is, taken control of, XA-MP Bus 12 for an extended period.

As represented in FIG. 2, CMDAI 64 provides outputs to the memory command FIFO mentioned above for storage therein, the outputs including the addresses and commands of memory requests and certain control bits. CMDAI 64 also provides Hit and Error output to XAMPCI 62 to indicate when, respectively, received memory requests are valid or invalid, for certain reasons.

It is indicated in FIG. 2 that MC 38 has a further interface to XA-MP Bus 12 and the associated bus operation control lines through an Exception Control (EXCEPT) 66 which is provided to handle exception and error conditions. EXCEPT 66 will not be described farther at this point, but is described in the detail in the detailed description of MC 38. MC 38 also includes a Scan Control (SCAN) 65, which also will be described in the detailed description of MC 38.

Memory operation requests are pipelined in MC 38 through operation of a Memory Control FIFO (MC FIFO) 68 mentioned above. As indicated, MC FIFO 68 receives address, command and response inputs from CMDAI 64 and XAMPCI 62, which define memory operations to be performed and stores these operations to be operated upon in the order received.

Other inputs are provided to MD FIFO 68 from MDP 40 and include MDPE0# and MDPE1# bus control signals indicating the presence of a parity error detected on the corresponding Data Bus 26 by MDP 40. A (Memory Cycle Inhibit) MCI# signal indicating that a current memory operation has been canceled, as previously described, and Cache Data Modified (CDM#) and Cache Data Shared (CDS#) signals indicated that the presence of a modified or shared copy of the requested data has been indicated in another functional unit and that the current memory cycle is canceled. The ACK# and NAK# signals respectively indicate that MC 38 has accepted or not accepted a current memory operation, while Command or Address Error (CAE#) indicates that MC 38 has detected a command or address error.

MC FIFO 68 and EXCEPT 66 each have control signal interfaces with an MC MANAGER 70, which provides basic control and management functions for memory operations. As indicated, MC MANAGER 70 receives request signal FREQUEST from MC FIFO 68 indicating the present of a pending request and in return provides an FGRANT signal indicating that the request may be executed. MC MANAGER 70 concurrently provides an EGRANT signal to EXCEPTION 66 indicating the request may be executed and receives an EREQUEST indicating the presence of a pending request.

As a result of these signals, MC MANAGER 70 then provides control outputs to a DRAM CONTROLLER 72 to be used by DRAM CONTROLLER 72 in controlling the generation of addresses (ADDR), Row Address Strobes (RASs), Column Address Strobes (CASs) and Write Enable (WE) signals to the MSEs 36 of the MMs 14. As is common, MSEs 36 are comprised of dynamic random access memories (DRAMs) physically constructed as SIMM modules.

Other inputs to DRAM CONTROLLER 72 include address, cycle and lane control signals provided from MC FIFO 68 or from EXCEPTION 66 which, as described in detail in the detailed description of MMs 14 are essentially addressing information derived from the request address and command information stored in MC FIFO 68.

As shown in FIG. 2, MC 38 includes a Visible Register Block (VRB) 74 having inputs from MC FIFO 38, EXCEPTION 66, MC Manager 70 and an MDP Interface (MDPI) 76 which is comprised of registers which are accessible to the system and which are used to store and provide basic control and error information.

MDPI 76 essentially provides a control and synchronization interface between MC 38 and MDP 40 to control and synchronized the transfer of data into and out of an MM 14 through MDP 40 with the control of memory operations by MC 38.

As indicated, these control signals exchanged between MC 38 and MDP 40 include multi-bit MC Commands (MCMD0 and MCMD1) which are commands passed between MC 38 and MDP 40 so that each unit may request certain operations of the other. As described in the detailed descriptions of MC 38 and MDP 40, these commands are essentially concerned with the particularly type of memory read or write operation to be performed, such as whether the MSE 36 is to perform a read of a bus word or a cache line from the DRAMs of the SIMM arrays. Data lines MDATA0# and MDATA1# are used to pass data used in MC 38/MDP 40 operations between MC 38 and MDP 40, as described in the detailed description of MC 38 and MDP 40, and signals MGO0# and MGO1# are used to initiate operations by MC 38 or MDP 40.

Further detailed descriptions of MC 38 may be found in Appendix 2, which is titled "Memory Controller".

b. Description of Memory Data Path 40

Referring now to FIG. 3, therein is represented a block diagram of an MDP 40. As described, MC 38 essentially provides all timing and control functions and signals for the MMs 14 and the memory and XA-MP Bus 12 operations performed by the MMs 14 while MDP 14 is essentially a pipelined data path between XA-MP Bus 12 and the memory elements of MSE 36. As has also been described, each MM 14 will have two MDPs 40, one connecting to each of the Data Buses 26, and each functional unit having data connections to Data Buses 26 will similarly each contain two similar data path elements connecting to the two Data Buses 26. In those implementations of System 10 using or having only one Data Bus 26, each MM 14 will have, or will use, only one MDP 40 and each other functional unit will similarly have, or use, only one data path element to connect to the single Data Bus 26.

MDP 40 includes an XA-MP Bus 12 Data Interface (XAMPDI) 78 to XA-MP Bus 12 and a DRAM Interface (DRMI) 80 to the DRAMs of the MSEs 36. As shown, XAMPDI 78 has a bidirectional data interface with Data Buses 26 of XA-MP Bus 12 for transferring 64 bits of data (BD) and 8 bits of data parity (BDP) with XA-MP Bus 12. XAMPDI 78 further has a bidirectional Bus Uncorrected Data Error (BUDE#) signal line interface with a control line associated with XA-MP Bus 12 to receive and provide a signal indicating an uncorrected error in the data being provided to or read from the memory.

MDP 40's data interface with MSE's 36 is provided through DRMI 80 and is comprised of two bidirectional 64 bit wide data paths to and from the DRAMs of MSEs 36, referred to in FIG. 3 as DD0(63:0) and DD1(63:0). As has been described, the memory elements of MSEs 36 are organized as two columns, an even address column and an odd address column, wherein each column is one bus word, or one quarter cache line wide. The two data buses connecting to the MSE 36 memory elements are therefore capable of transferring a bus word in one memory internal cycle or a single cache line in two memory internal cycles. Associated with and parallel with each data bus to the MSEs 36, that is, with DD0(63:0) and DD1(63:0), are two bidirectional Error Detection and Correction buses identified as DC0(7:0) and DC1(7:0) for carrying data check bits between the memory elements of MSEs 36 and MDP 40. In this regard, it should be noted that the MSE's store not only the information but that row of each bus word wide column of the MSEs 36 also contains memory elements for storing data check bits associated with the corresponding bus words stored therein.

The input path from XA-MP Bus 12 extends from XAMPDI 78 to a Write Path memory (WRITE PATH) 82, which is used to pipeline data writes into the MSEs 36. As will be described further below, WRITE PATH 82 also has data path inputs from an EDAC Generator and Corrector (EDAC) 84, which in turn is connected in the data and check bit path output from DRMI 80. As described in the detailed description of MDP 40, this path is used for data write back and correction operations.

The data path output from WRITE PATH 82 is connected to a data path input to DRMI 80, providing the path through which information is written into MSEs 36. The data path output from WRITE PATH 82 is also connected to a data path input into a Write Check Bit Generator (WCBG) 86 which generates check bits for each bus word to be written into MSEs 36 and provides the check bits through a check bit write path input to DRMI 80 in parallel with the data provided as bus words to be written into MSEs 36 from WRITE PATH 82.

The data word output of WRITE PATH 82 is also provided as inputs to MDP Registers (MDPRs) 88 to allow writing of certain MDP 40 registers. The output of WRITE PATH 82 and MDPR 88 are provided as inputs to an MC Interface (MCI) 90, which interfaces with MDPI 76, previously described, and are used to generate the control and data signals exchanged with MDPI 76. As indicated, the control and data signals exchanged with MDPI 76 further include a FIFO Error signal (FIFOERO#) which indicates when there has been an error in the FIFO comprising WRITE PATH 22 or the FIFO comprising READ PATH 92, such as a requested read operation upon an empty FIFO or a write operation upon a full FIFO.

Next considering the data output path through MDP 40, the data and check bits read from MSEs 36 through DRMI 80 are provided as inputs to EDAC 84, which performs error detection and correction operations and generates corrected data bits for the bus word read from MSE's 36 and error signals SBE# and MBE#, all of which are provided as inputs to READ PATH 92.

READ PATH 92 is essentially a FIFO for pipelining data reads from the MMs 14 and the data bit outputs of READ PATH 92 are provided to XAMPDI 78 for transfer onto SA-MP Bus 12 as required.

Finally, MDP 40 includes State Machines (STATE) 94 which controls certain operations of MDP 40. As indicated, STATE 94 receives a Bus In (BIN#) signal from MD 38 which enables the transfer of data from XA-MP Bus 12 into MDP 40 and a Bus Out (BOUT#) signal from MC 38 which enables the transfer of data from MDP 40 to XA-MP Bus 12. Other signals from MC 38 include a Bus Acknowledge signal (BACK#) which indicates a valid acknowledged write cycle and an Initiate (INIT) signal to initialize MDP 38. STATE 94 also receives BDATA, MGO and MCMD from MC 38, as described further in the detailed descriptions of MC 38 and MDP 40.

Having described the overall structure and operation of an MM 14, focusing in particular on MC 38 and MDP 40, the following will describe certain specific functions and operations of the MM 14.

Further detailed descriptions of MDP 40, including the features described in the following, may be found in Appendix 3, titled "Memory Data Path".

3. Error Correction for Stored Data

MMs 14 perform error correction of data stored in MSEs 36 by a read-correct-writeback operation wherein the read-correct-writeback operations are performed in such a manner as not to delay the normal reading and writing of information from and to the memory elements. In this respect, it has been described above that MDP 40 performs error detection and correction of information read from memory, through operation of EDAC 84 and generates check bits for information written into memory, through operation of WCBG 86, the check bits being written into memory and stored with the information.

When MDP 40 reads a bus word from memory and detects an error in the data, that is, the data is in accordance with the check bits associated with the data, MC 38 will receive MCDE and note the address location of the data in error being corrected through EDAC 84 for transfer to XA-MP Bus 12 and will store this error address information (ERROR ADDR) in a Correction Queue (CORRQ) 96.

As indicated in FIG. 4, and as has been previously described, memory requests, that is, commands indicating operations to be performed and addresses of information to be read or written are received from XA-MP Bus 12 by XAMPCI 62, are stored in the pipeline queue comprised of XAMPCI 62 if to be executed by the memory, and are executed by MC 38 and MDP 40. As has been described, memory read operations of bus words and cache lines are performed as in-order operations, that is, each operation is performed in the order received. The operations of MC 38 and MDP 40 are coordinated through operation of a Pending Request Queue (PREQQ) 98 maintained by MC 38 wherein MC 38 stores identifications of all pending requests. MDP 40 then provides information regarding requests as executed and provides this information to MC 38's PREQQ 98, thereby allowing MC 38 and MDP 40 to remain in synchronization.

Associated with XAMPCI 62, CORRQ 96 and PREQQ 98 is an Operation Arbitrator (OPARB) 100 which monitors the state of pending requests in XAMCI 62 to detect when the queue of pending requests is empty. When the queue is empty, OPARB 100 checks CORRQ 96 to determine whether the memory has detected any storage locations containing uncorrected error and, if the addresses of any such locations are enqueued in CORRQ 96, performs read-correct-writeback operations. In each such operation, MDP 40 will, in cooperation with controlling operations of MC 38, read the data from that address location from MSE 36 through DRMI 80, correct the data through EDAC 84 and provide the data back through WRITE PATH 82. The data will pass through WRITE PATH 82 to WCBG 86, where new check bits will be generated, and the corrected data and new check bits will then be written back into MSEs 36 through DRMI 80. In the event that OPARB 100 detects that CORRQ 96 is full, the data correction operations will be performed as just described, but will be performed even if there are pending requests.

MMs 14 thereby perform error detection and correction on data stored in the MSEs 36, but without interfering with the execution of read and write operations, by storing identifications of locations containing errors and performing read-correct-writeback operations when there are no pending requests.

Another feature of MDP 40 is illustrated by referring to FIG. 3 wherein there is represented a gated bypass data path around READ PATH 92 with control of Bypass Path Gate (BPG) 102 provided by a FIFO EMPTY signal output of READ PATH 92. As has been described, READ PATH 92 is essentially a FIFO queue wherein the information and parity bits resulting from read request operations are passed through the queue and to XA-MP Bus 12 in the order executed. In the event that all request have been executed, the queue will be empty and a new request would have to pass through READ PATH 92's queue, requiring several clock cycles, depending upon the depth of the queue, before being available for transfer to XA-MP Bus 12. In the event the queue is empty, however, this condition is detected by READ PATH 92 which asserts FIFO EMPTY to BPG 102, which responds by gating the information around READ PATH 92 and directly to XAMPDI 78 and MC 38 sends MDP 40 a BOUT signal requesting that data be put onto XA-MP Bus 12, thereby providing the requested information to XA-MP Bus 12 one clock cycle sooner than would be available through READ PATH 92.

4. Adaptive Memory Timing

MMs 14 further includes the capability of adaptively altering the absolute and relative timing of the memory operation timing signals generated by MC 38 and used by MC 38 and MDP 40 in controlling memory operations in such a manner as to adapt the operations of an MM 14 to obtain the maximum speed of operation possible with the particular SIMM circuits used in an MM 14. The controllable signals include the SIMM timing signals, including RAS, CAS and WE, generated by MC 38's DRAM CONTROLLER 72, together with other timing signals generated by MC 38 and used by MC 38 and MDP 40 to control the operations of MM 14.

Figure 5:
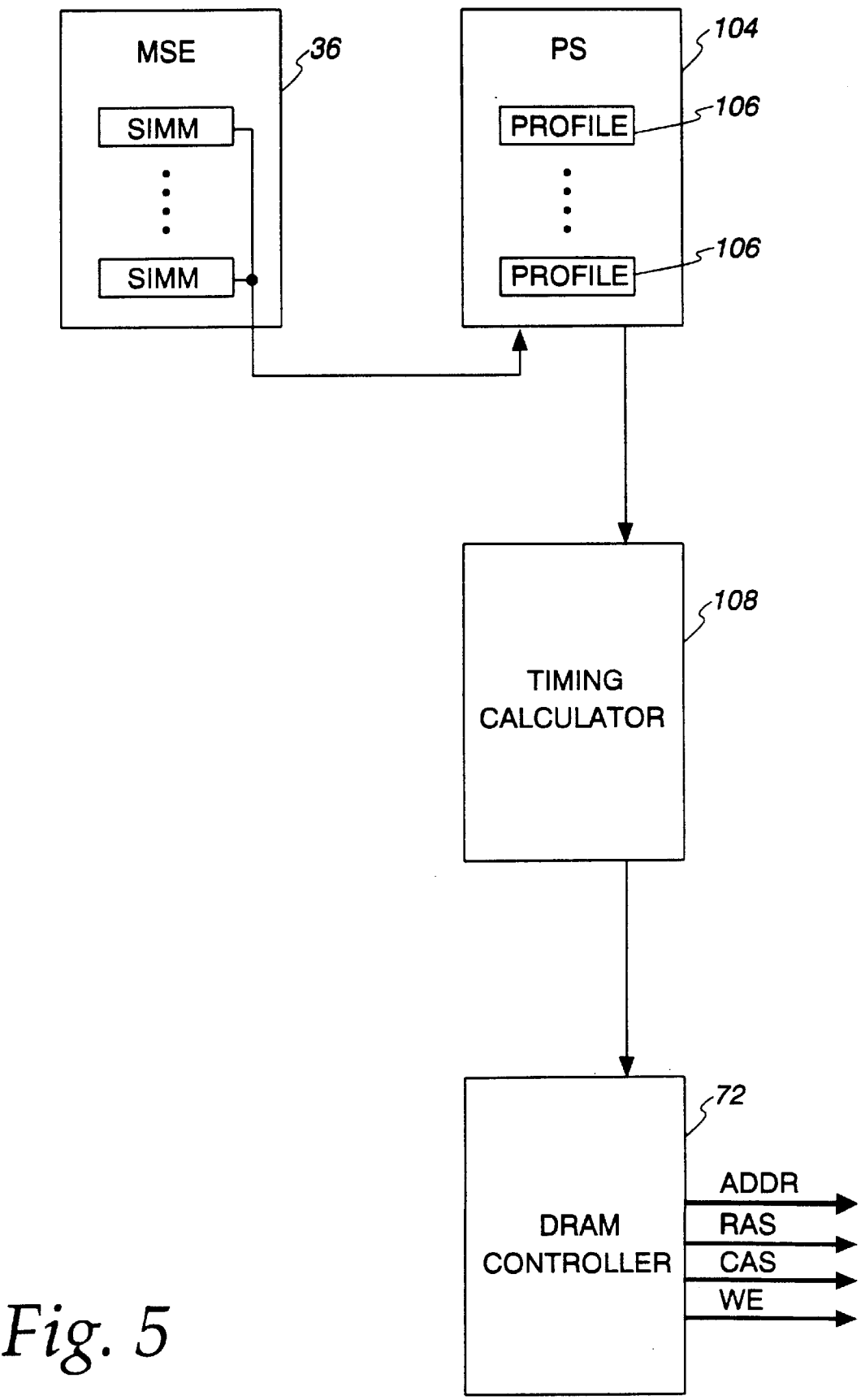
FIG. 5 is a block diagram of adaptive memory timing logic.

Referring to FIG. 5, it is well know that SIMM circuits provide coded values upon certain pin outputs which indicate at least the size and speed of the particular SIMM circuits. In the present system, these encoded values available through the SIMM circuit pins are brought out of the MM 14 MSE 36s and are made available to MC 38. The present system further includes a Profile Store 104, which is located in a storage location in MM 14, wherein Profile Store 104 could contain a Profile 106 for each type of SIMM group which may appear in an MSE 36.

Each Profile 106 contains a set of values representing the timing characteristics of the corresponding type of SIMM module, wherein the timing characteristics represent the various maximum gate delays, recharge times, the timing event intervals of the SIMM module internal circuitry. In the present system the timing characteristic values are not expressed in time units, such as nanoseconds, but are instead values representing the comparative timing characteristics of the SIMM modules, such as counts in terms of the double speed clock. The timing characteristic values, however, are selected to easily represent the timing characteristics of both the SIMM modules and the basic clocks used in MMs 14 to generate timing signals.

At system initialization, MC 38 will read the SIMM module coded timing characteristic values provided from the SIMM module pin outputs and will use the coded values to select and read a corresponding Profile 106 or Profiles 106 from Profile Store 104. The timing characteristic values are then provided to a TIMING CALCULATOR 108 in the MM 14's MC 38. TIMING CALCULATOR 108 is provided with the calculation functions necessary to calculate the maximum time intervals required to perform each SIMM operation, such as the maximum time which must occur between a RAS signal and a next RAS signal, the maximum time which may occur between a write enable signal and the result of the write enable signal, and so forth.

TIMING CALCULATOR 108 will calculate and provide a set of timing control values which represent the times at which timing events are to occur in the operation of the SIMMs, wherein each timing event is represented by a timing signal and the timing control values are in units of clock periods of the MM 14 internal clock used to control the SIMM operations. In the present system, timing events are determined, that is, calculated, as both "absolute" times and as "relative" times wherein the time of occurrence of an "absolute" event is determined relative to a $T_0$ representing the start of a memory operation cycle and a "relative" event is determined relative to a previous event. For example, the time of occurrence of the RAS and CAS signals may be determined as absolute events relative to the $T_0$ start of a memory cycle while the time of occurrence of a WE or the time at which data will appear from the SIMM modules may be determined relative to a previous event, such as the occurrence of a RAS or CAS signal.

The timing control values are then provided to DRAM CONTROLLER 72 and used by DRAM CONTROLLER 72 to generate the actual timing signals, such as RAS, CAS and WE, to the SIMM modules.

It should be noted that in alternate embodiments of the present invention, it may be preferable to pre-calculate the timing values for each profile and to simply load the timing values to DRAM CONTROLLER 72 rather than calculating the timing values through a TIMING CALCULATOR 108 at system initialization.

In a present embodiment of the system, each MM 14 in the system will use a single Profile 106, selecting the profile which matches the slowest SIMM module contained in that particular MM 14. In alternate embodiments, it is possible to use multiple PROFILEs 106 within a single MM 14 to accommodate different SIMMs within an MSE 36. In this latter instance, the DRAM CONTROLLERs 72 will store two or more sets of timing values, possible in a set of registers associated with DRAM CONTROLLERs 72, and will select a set of timing values dependent upon the address locations being accessed, that is, dependent upon the type of SIMM modules currently being accessed.

In a yet further embodiment of the present invention, the timing characteristic values included in PROFILEs 106 will further include timing characteristic values reflecting the data transmission rates of Data Buses 26 of XA-MP Bus 12 and these values will be used in calculating the timing control values provided to DRAM CONTROLLERs 72. In a yet further implementation, DATA Buses 26 within a single system may have different transmission rates and the PROFILEs 106 will contain timing characteristic values for the different bus transfer rates. In this instance, again, DRAM CONTROLLER 72 will be provided with and will use multiple sets of timing control values, with the values used during any memory cycle being dependent upon which DATA Bus 26 the information is being written to or read from.

Finally, as has been described the MSEs 36 are internally organized as two partitions, so that reads from and writes to the MSEs 36 are generally interleaved, if enabled, that is, to or from alternate partitions of the MSEs 36, thereby increasing the overall transfer rate of data into and out of the MSEs 36. In the present embodiment of the system, the interleaving of memory cycles, that is, the alternation of memory cycles to the partitions of the MSEs 36, are controlled by the timing characteristic values provided in the PROFILEs 106 and are executed by what are effectively two DRAM CONTROLLERs 72, one providing the timing signals for each partition of the MSE 36 SIMM array. In this instance, one of the timing signals generated by each of the controllers is a timing signal provided to the other controller to initiate the memory timing cycle of the other controller, that is, a $T_O$ timing signal.

Each controller therefore determines the interval between the conclusion of its own timing cycle and the start of the next timing cycle, generated by the other controller, and thereby controlling the interleaving of timing cycles. The timing cycle initiate even generated by each controller may be calculated to occur at any time during the timing cycle of the controller generating the initiate event for the other controller, allowing any degree or period of overlap or non-overlap of the timing cycles, with the interleaving of timing cycles being determined by the profile information.

Finally, TIMING CALCULATOR 108 and DRAM CONTROLLER 72 are implemented in the present implementation of System 10 as two state machines. A detailed description of the design and construction of these state machines in provided in Appendix 4 and, as in Appendices 5, 8 and 10, is presented in the iLogix hardwarre description format using the iLogix hardware design tools available from iLogix Company of Burlington, Mass.

In a further aspect of MMs 14, the refresh cycles of the partitions, which are controlled by DRAM CONTROLLER 72, are controlled individually and the refresh cycles of the DRAMs of the partitions may be staggered to reduce the peak power consumed by refresh, which involves reading all DRAMs of a partition at a time. Refresh control bits are read in and provided to DRAM CONTROLLER 72 to control the timing of the refersh cycles.

5. In-Order and Out-Of-Order Bus Transfers

As has been described, the primary mode of information transfer over XA-MP Bus 12 is by in-order operations and is used for bus word and cache line reads from memory. A functional unit other than the memory may respond to a request, however, as when a processor unit holds a modified copy of the requested data in its cache, by asserting an MCI command to cancel the read request in memory and to inform the requester that the request will be fulfilled by another functional unit other than the memory and by an out-of-order transfer.

As described, in-order transfers are responded to by the memory in the order in which the requests are placed on the bus and is initiated by the requester gaining control of XA-MP Bus 12 and placing the address of the requested information on ADDR Bus 28, together with the bus control signals. Each functional unit tracks its own in-order memory requests, independently of other functionals, through operation of an ordered request queue in each functional unit. The ordered request queue in each functional unit allows each function to track both its own requests for memory reads and all ordered transfers from the memory, whether to that functional unit or to another functional unit, to detect when an ordered transfer from memory appears on XA-MP Bus 12 in response to one of its own requests. A functional unit may then respond by accepting the data from XA-MP Bus 12. Ordered transfers thereby eliminate the usual sequence of handshaking operations executed between an information requester and an information provider in the response portion of split bus operations in that the responder is required only to place only the requested information and bus control signals on XA-MP Bus 12 in the order in which the in-order requests are received and is not required to identify the recipient of the information further.

To briefly review and summarize the execution of in-order bus operations as described in other sections of this description of a presently preferred embodiment of the invention, including the appendices which are included in this description, the bus interface control unit of a functional unit will place a request for information on XA-MP Bus 12 by placing the address of the information on ADDR Bus 28, an in-order command for a bus word, cache line or double cache line on CMD 30, and asserting the command strobe (CS). The MM 14 whose address space contains the address of the request will recognize the request as being within its address space and will respond by accepting the request, as indicated by the MM 14 asserting an ACK.

If not canceled by an MCI command asserted by another functional unit, the memory will place the request in its MC FIFO 68 queue to be executed in the order received, wherein the request information stored in MC FIFO 68 includes the type of operation requested and the address of the requested information. If the request is canceled by an MCI command, the request will be canceled and will not be placed in MC FIFO 68.

When the request is finally executed from MC FIFO 68, the memory places the requested information on one of Data Buses 26 in one or more bus transfers. The memory also asserts appropriate control signals on the bus at the start of the transfer, including asserting an ORD#0 or an OED#1 signal, depending upon which of Data Buses 26 is information is being provided, and asserting Data Strobes (DSs).

The bus interface control element of the originally requesting functional unit will detect the occurrence of an in-order response on XA-MP Bus 12, as it has been detecting the occurrence of all in-order responses appearing on XA-MP Bus 12, by monitoring the CMD Bus 30 and the ORD control lines. If the response corresponds to an in-order request that it earlier placed on XA-MP Bus 12, the functional unit will respond by accepting the information from the Data Bus 26 that the information is being sent on and reading the information from the Data Bus 26 as indicated by the Data Strobes.

In the present embodiment of System 10, only the memory has an operation queue, in MC FIFO 68, and this only the memory may contain more than one outstanding request at a time. The functional units other than the memory therefore require only a single register or memory in their bus interface control elements to store their outstanding requests. In alternate embodiments, however, each functional unit may be provided with a request queue in its bus control interface element to store multiple outstanding requests. In this implementation, the in-order request queue in each functional unit may be expanded in a manner similar to the in-order request queue in each MM 14 to provide response indications for multiple requests.

As the above operations of the bus control interfaces of the memory and other functional units are described in detail in the structural and operational descriptions for each functional unit, the following will focus on the in-order queue in the memory and in each functional unit and the functional elements in the memory and in the functional units that operate with and exchange signals with the in-order queues will be understood by reference to the descriptions particular to the memory and the other functional units.

Figure 6:
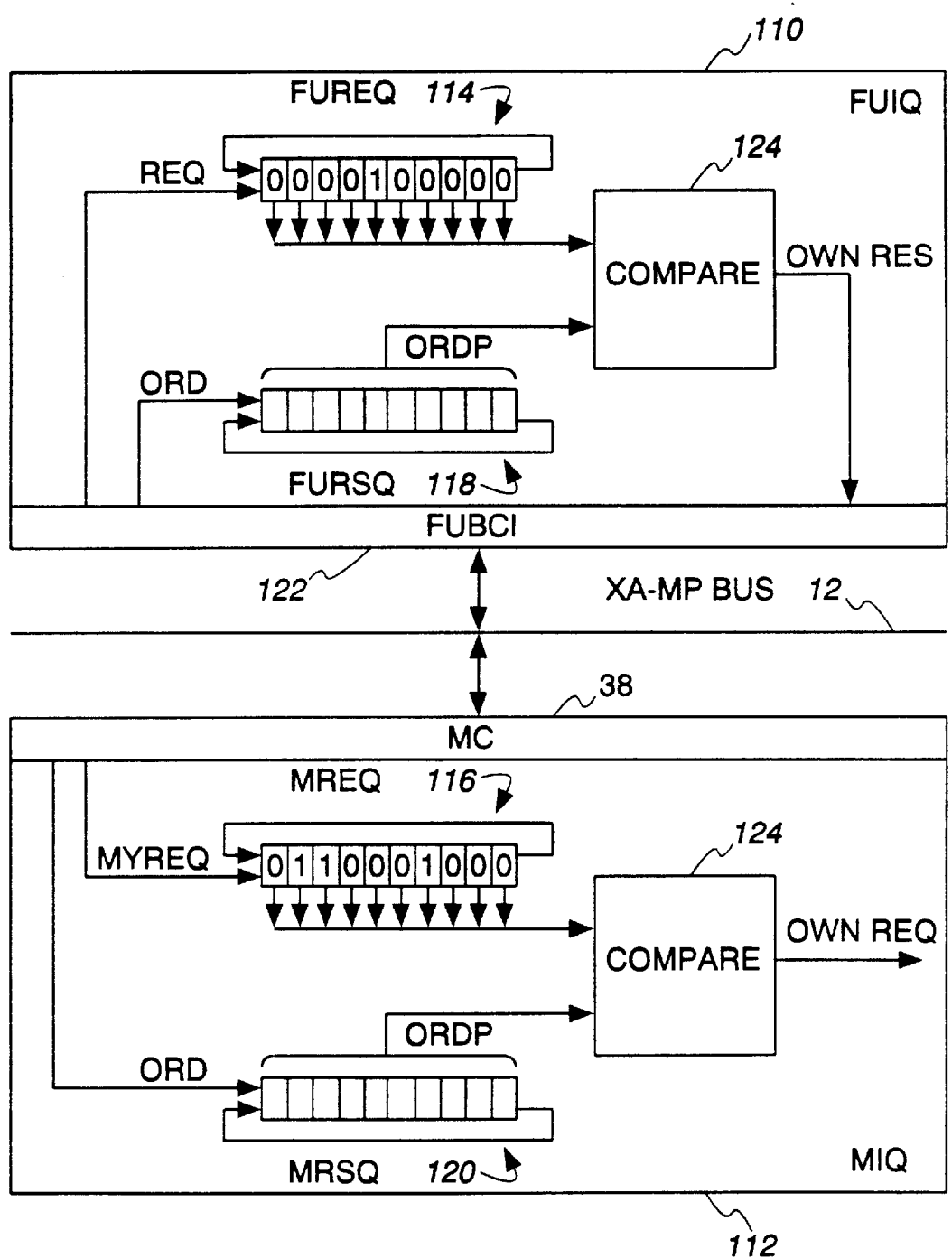
FIG. 6 is a block diagram of an in-order request/response queue.

Referring now to FIG. 6, therein is presented a functional block diagram representation of an in-order queue in a functional unit and the in-order queue in the memory. It should be noted that there is an in-order queue in the bus control interface element of each functional unit and in each MC 38 of each MM 14.

As shown, the in-order request queue residing in a functional unit is identified as Functional Unit In-Order Queue (FUIQ) 110 while the in-order request queue residing in an MC 38 is identified as Memory In-Order Queue (MIQ) 112. Each is comprised of a request queue and a response queue, respectively referred to as Functional Unit Request Queue (FUREQ) 114, Memory Request Queue (MREQ) 116, Functional Unit Response Queue (FURSQ) 118 and Memory Response Queue (MRSQ) 120, wherein FUREQ 114 tracks in-order requests submitted by the functional unit, MREQ 116 tracks in-order requests accepted by the MIC 38 for the MM 14, FURSQ 118 tracks in-order responses appearing on XA-MP Bus 12 from any MM 14 and MRSQ 120 tracks in-order responses appearing on XA-MP Bus 12 from any MM 14.

Referring first to FUIQ 110, the Functional Unit Bus Control Interface (FUBCI) 122 of the functional unit places in-order requests on XA-MP Bus 12 as described elsewhere herein and upon placing each in-order request on XA-MP Bus 12, inserts an indication of the request (REQ) into FUREQ 114. FUREQ 114 may, for example, be implemented as a single bit wide wrap around shift register wherein the output is connected back to the input, so that the requests will rotate in the loop until fulfilled. In this implementation, the insertion of a request indication REQ is accomplished by placing a bit in the input of the shift register, such as a logic "1". FUBCI 112 detects each in-order request placed on XA-MP Bus 12 by any functional unit and clocks FUREQ 114 upon each appearance of an in-order request on XA-MP Bus 12, so that the REQ indications in FUREQ 114 are moved along the shift register and so that the position of any REQ indication thereby represents the relative order of an in-order request by that functional unit relative to all other in-order requests made by all other functional units.

FUIQ 110 tracks all in-order responses appearing on XA-MP Bus 12 through operation of FURSQ 118, which is clocked by the functional unit's FUBCI 122 each time the FUBCI 122 detects an in-order response from an MM 14 on XAMP Bus 12. In response, FURSQ 118 generates a pointer (ORDP) which identifies the occurrence of a current in-order response in a sequence of in-order responses. FURSQ 118 and the analogous MRSQ 120 in MIQ 112 are represented in FIG. 6 as rotating shift registers moving along a bit which represents a current response, but may alternately be implemented as counters whose number output identifies, at any time, a current response in a sequence of responses.

The position of each REQ indication in FUREQ 114 is compared to ORDP from FURSQ 118 by a COMPARE 124 and when the position of an REQ indication is found to coincide with a current response as indicated by ORDP, an Own Response (OPWNRES) output is generated to FUBCI 122 to indicate that a current in-order response corresponds to an in-order request earlier submitted by the functional unit.

In summary, therefore, FURSQ 118 tracks and indicates the sequential occurrence of in-order responses on XA-MP Bus 12 while FUREQ 114 tracks and indicates the location or locations of the functional unit's own in-order requests in the sequence of in-order requests that have been placed on XA-MP Bus 12, and a coincidence between FURSQ 118 and FUREQ 114 indicates an in-order response corresponding to an in-order request submitted by the functional unit.

Referring now to MIQ 112, each MM 14 is required to track its own in-order operations relative to in-order operations performed by all MMs 14 resident on XA-MP Bus 12 as each MM 14 will execute in-order operations independently of the other MMs 14, with each MM 14 recognizing in-order requests directed to its own address space and accepting and responding to the requests.

MIQ 112 operates in much the same manner as FUIQ 110, with MRSQ 120 tracking all in-order responses appearing on XA-MP Bus 12 in the same manner as FURSQ 118. MREQ 116, however, tracks the in-order requests accepted by the MM 14 relative to all other in-order requests, placing an indication of a request that it has accepted (MYREQ) into MREQ 116 each time it accepts a request. MC 38 detects each in-order request appearing on XA-MP Bus 12 and clocks MREQ 116 each time an in-order request is accepted by any of the MMs 14, that is, upon each occurrence of an in-order request which is not canceled by an MCI. As represented, MREQ 116 may therefore contain several MYREQ indications, one for each accepted by the MM 14, MREQ 116 will thereby contain a sequence of request indications which represents the sequence of occurrence of each in-order request that has appeared on XA-MP Bus 12 and wherein each request accepted by the MM 14 is represented by an MYREQ and each request accepted by another MM 14 is represented by another indication, such as a logic "0".

In a manner similar to FUIQ 110, a COMPARE 124 will provide an Own Request (OWNREQ) output when there is a coincidence between an ORDP output of MRSQ 120 and a MYREQ from MREQ 116, thereby indicating that the MM 14 is to execute the corresponding in-order request stored in its MC FIFO 68 as the coincidence indicates that this was the next in-order request accepted by the MM 14s of System 10. MC 38 of the MM 14 will respond to the OWNREQ by executing that request.

Further description of the operation and execution of in-order and out-of-order operations will be found in other sections of the description, including the appendices which are a part of this description of System 10.

6. Address Space Mapping

As described previously, System 10 provides a unified environment by performing all operations within a single address space wherein all data, program and information storage functions of the system taht are related to bus operations occupy that single address space. Such information storage functions may include, for example, the memory space in MMs 14, registers of Processor Units 42, and other information storage functions, such as the display memories of video controllers and I/O devices, and the space required to store operating systems and BIOSs, such as the ROM BIOSs commonly used in personal computers.

The management of bus related information storage, however, is distributed among the functional units of the system, so that, for example, MMs 14 are responsible for managing the address locations within that address space that are used by MSEs 36 to store data and programs. In a like manner, the PMs 16 are functionally responsible for managing the address space locations occupied by the bus related registers of PMs 16 while BMs 18 are responsible for managing the address space locations used by video display controllers and occupied by Read Only Memories and other memories for storing such programs and data as ROM BIOSs.

The management of the single system address space is essentially performed by the mapping of the various storage means, such as the PM 16 registers, the physical memory locations in MMs 14, and such storage as is provided in ROMs for ROM BIOSs and as video memory for video display controllers, into the address space. In System 10, each functional unit is therefore responsible for mapping its bus operation related storage spaces into the single system address space. An example of this mapping has been discussed previously with regard to the mapping of the PM 16 registers into the system address space.

Figure 7:
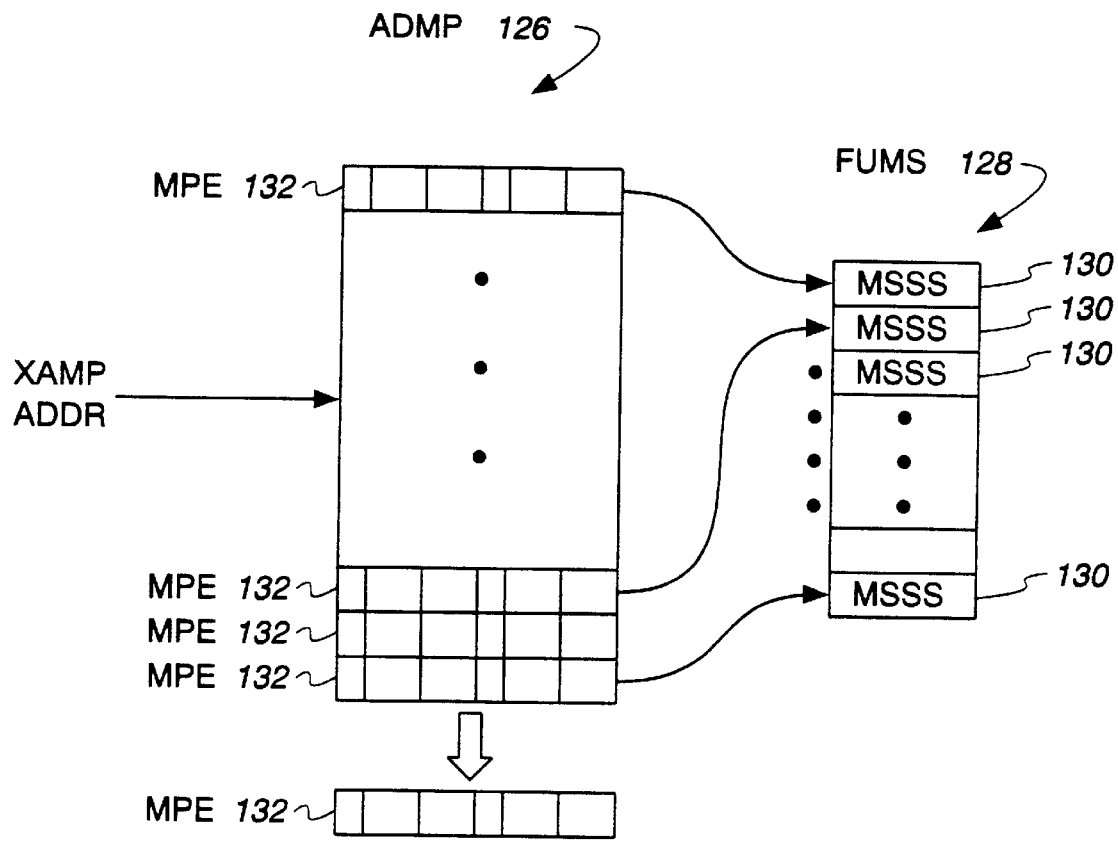
FIG. 7 is a block diagram of address space mapping.

This process is functionally and diagramically illustrated with the aid of FIG. 7, which illustrates the basic mapping function performed in each functional unit. It will be appreciated that the functions described herein may be performed in a number of ways, such as through memory resident tables or through programmed gate array, but that the basic function performed will be essentially the same for each implementation.

FIG. 7 shows the use of an Address Space Map (ASMP) 126 in a functional unit to map and relate system memory space addresses appearing on XA-MP Bus 12 (XAMP ADDRs) into the memory and storage space or spaces in each functional unit, indicated in FIG. 7 as Functional Units Memory Space (FUMS) 128.

As indicated, each FUMS 128 may be organized or partitioned into Memory Space Sub-Spaces (MSSS) 130 which may in turn represent contiguous areas within a single memory space, as in the MSEs 36 of the MMs 14, or individual locations within the memory and storage spaces of or accessible to the functional unit, such as individual ROMs for ROM BIOSs and video memories for video display controllers.

ADMP 126 contains a Map Entry (MPE) 132 for each MSSS 130 of the functional units memory space wherein each MPE 132 also corresponds to an address or range or addresses in the system address space as represented by the XAM ADDR addresses.

The information contained in each MPE 132 may depend upon the particular functional unit for which the address space mapping is being performed, but will most often at least contain at least a bit represented as bit 134 which indicates that the functional unit contains a memory space (MSSS0 130 corresponding to the corresponding XAMP ADDR address or range of addresses. Bit 134 would be used, for example, in MMs 14 to detect that the MM 14 contains a memory space containing the information indicated by an address provided on XA-MP Bus 12 as part of a memory read request.

Continuing with this example, each MPE 132 may contain further bits or fields that would contain information identifying the row, column and group of SIMM modules containing the corresponding memory locations. Therefore, in addition to quickly identifying whether an address location resides in a given MM 14, the information from the MPE 132 would, with equal speed, translate the address given in the memory request on XA-MP Bus 12 into a physical location in the SIMM modules by concurrently providing the row, column and group numbers of the SIMM modules containing the addressed information and this information can be provided to DRAM CONTROLLER 72 so that a corresponding read operation from the addressed locations in the SIMM modules can be performed without further delay.

In a further example of the address space mapping provided in the functional units of System 10, it may be desirable to offset the address allocations of MSSSs 130 relative to the system address space. An example of such may be in the case of MMs 14 wherein the MMs 14 are to contain a contiguous address space formed of the memory locations of the SIMMs but wherein it is desired to reserve certain low addresses for specific purposes, such as for system or processor registers. In this instance, the functional units outside of MMs 14 would contain registers identifying the address locations to be reserved and the MPEs 132 of the MM 14 ADMPs 126 could be entered into the ADMPs 126 in an offset order, thereby providing an automatic offset in the system address space to memory location mapping performed in the MMs 14. In a similar manner, the coded size information read from the SIMMs may be used by the system to generate ADMP 126 offsets for each MM 14 so that each MM 14 address space to memory location mapping can be offset in a manner to map the individual MM 14 memory locations to form a contiguous address space.

As described, the information contained in the MPEs 134 may differ between functional units, according to the address mapping needs of the functional units, an example of such being the mapping of the Processor Unit 42 registers as compared to the mapping of MM 14 memory locations. In other functional units, the information may, for example, reflect whether the corresponding memory or storage locations are cacheable or non-cacheable or read-only.

Finally, in the present implementation of System 10, the address mapping for the functional units is performed either at system initialization time or beforehand and stored, and is loaded into the ADMPs 126 of the functional units at system initialization.

7. Bus Access Arbitration

As discussed previously, among the system functions which are distributed among the functional units of the system is the contention and arbitration of access to XA-MP Bus 12 by the functional units of the system. The sole exception is MMs 14, which do not arbitrate for access to the bus.

The functional units of System 10, referred to otherwise herein as "slices", each include arbitration logic connected to Arbitration Lines (ARB) 32 to contend for access to XA-MP Bus 12 on a relative priority basis wherein their respective priorities are determined by their "slice" locations along XA-MP Bus 12.

Figure 8:
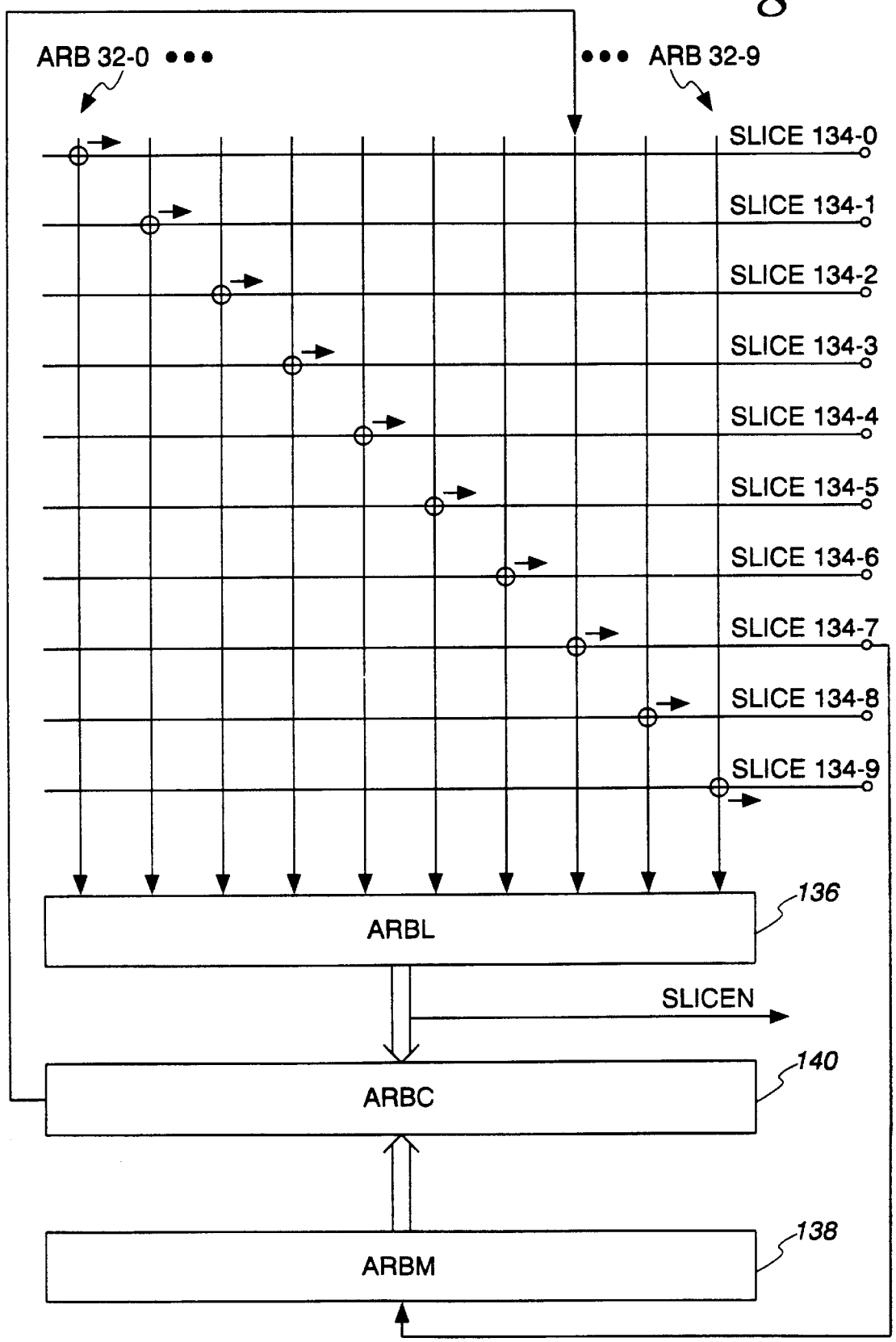
FIG. 8 is a block diagram of a bus access arbitration mechanism.

Referring to FIG. 8, therein is shown a diagrammatic, functional illustration of the arbitration mechanism of System 10. As has been described, arbitration is executed through a plurality of Arbitration Lines (ARB) 32, indicated herein as ARB 32-0 through ARB 32-9. Each slice, or functional unit, of System 10, is indicated in FIG. 8 as one of SLICEs 134-0 through 134-9, thereby representing a system having 10 slices, or functional units. The upper portion of FIG. 8 illustrates the connections of the SLICEs 134 to the ARB 32 lines and the lower portion of FIG. 8 is a functional block diagram representation of the arbitration logic in one SLICE 134.

As indicated, the arbitration logic for each SLICE 134 includes an Arbitration Signal Latch (ARBL) 136 having inputs connected from each ARB Line 32, an Arbitration Mask register (ARBM) 138 also having inputs connected from each ARB Line 32, and Arbitration Control (ARBC) 140. Each ARBC 140 is connected to the ARB Line 32 corresponding to its SLICE 134 to assert its SLICE's own ARB signal onto its own ARB 32 line.

As is diagramically represented in FIG. 8, the connections of each SLICE 134 to the ARB 32 lines is shifted with respect to the other SLICEs 134 as regard the input connections to ARBM 138. That is, each SLICE 134's ARBM 138 has an input connected from ARB 32-0, another connected from ARB 32-1, and so on. These shifted connections are symbolically represented in FIG. 8 by the circles represented at the intersection of one of the connections between an ARB Line 32 and a SLICE 134, wherein the circles indicate connection between the ARB Line 32 and the a first bit input to the ARBM 138 latches, with the order of increasing higher numbered connections being indicated by the arrow adjacent to the circle. It will be understood that the connections to ARB Lines 32 proceed in numeric order across the inputs of each SLICE 134, with the connections "wrapping around" so that each of ARB Lines 32 is connected to an ARBM 138 input of each of the SLICE 134. Each ARB 32 line is also connected to an input of ARBL 136, but through unshifted connections.

In the present implementation of System 10, the BRIDGE 56 is usually assigned the highest priority slice with the PMs 16 occupying lower priority slices. This assignment is not fixed, however, and any functional unit may be plugged into any slice location. The slice locations, and thus the relative priorities, of each slice will then be determined at system initialization, wherein a system master functional unit, usually a BRIDGE 56 will assert a logic level upon its ARB signal output from its ARBC 140. Because of the shifted connections between ARB Lines 32 and the inputs of the ARBMs 138, the logic level from the master unit will appear at successively number inputs across the ARBM 138's of the latchs and the input at which the logic level appears at the ARBM 138 inputs of any given slice will determine the slice number, and thus the relative priority of that slice. The inputs from ARB Lines 32 are latched and stored in each slice's ARBM 138 to be subsequently used by each slice as a "mask" in determining the time of access of the slice to XA-MP Bus 12 as described further below.

In the instance when only one slice has asserted its ARB Line 32, that slice will gain control of XA-MP Bus 12 and no arbitration is required. In the instance wherein several slices assert their ARB signals during the same bus clock cycle, however, the slices must arbitrate among themselves to determine which slice will have first access to the bus. In this regard, it should be noted that the arbitration mechanism alternates latches ARB signals into the SRBLs 136 and performs arbitration operations in the ARBCs 140 on every clock cycle.

If a number of slices assert their ARB signals during the same clock cycle, those slices form a "group" which will retain control of XA-MP Bus 12 among themselves by continuing to assert their ARB signals until each has gained access to the bus, each relinquishing access to the bus and releasing their ARB signal after it has executed its bus operation. The selection and sequence of bus accesses among the slices forming a group are performed through the "masks" stored in each slice's ARBM 138 at system initialization. Each slice in a group will, at each clock cycle, compare its mask to the current ARB signals latched in its ARBL 136, which are latched again at each clock cycle. This operation is usually performed by logically ANDing the slice's mask with the currently latched ARB signals. If a slice's ARBC 140 finds that there is a higher priority slice with an ARB signal currently latched into the slice's ARBL 136, the slice yields priority, and control of the bus, to the higher priority slice.

The slices in the group will then arbitrate among themselves at each successive clock cycle, gaining control of the bus according to their relative priorities as each higher priority slice completes it bus operation. Each slice will, upon completing its bus operation, relinquish control of the bus and cease to assert its ARB signal.

According to the priority arbitration rules implemented in the logic circuitry of each slice's ARBC 140, a slice which is a member of a group and which has either completed its bus operation and relinquished control of the bus, or has dropped out of its group by ceasing to assert its ARB signal, may not attempt to assert control for the bus until every member of the group has either completed its respectively bus operation or has dropped out of the group by ceasing to assert its ARB signal as a member of the group.

Further according to the arbitration rules implemented in the ARBCs 140, no slice which is not part of a group can assert its ARB signal or attempt to join the group until every member of the group has either completed its bus operation or has dropped out of the group. The exception to this rule is that a high priority slice may break into a group, but cannot break into two consecutive groups if it was NAKed out of the first group.

System 10's arbitration mechanism permits the overlap of bus access arbitration, but not of bus access, by providing a means in ARBC 140 whereby a slice may determine, from the ARB signals, that only one slice remains in a group, or that only a single slice has requested access to the bus at that time, effectively a group with only one member. The timing through the bus line latches at each end of each bus associated line, including the ARB 32 lines, and the alternate execution of ARB signal latches and access arbitration's on successive bus clock cycles permits a potential requester to ascertain that the ARB 32 line of a current owner of the bus will be released on the next bus cycle and to assert its ARB signal during that bus cycle, so that its ARB signal will be latched into the ARBLs 136 of the slices at the next bus cycle. Waiting requesters may thereby initiate the next arbitration for the bus while the last member of a previous group of a single possessor of the bus is completing its bus operation.

Finally, it has been previously described that certain requests for reads of information will result not in an in-order but in an out-of-order operation wherein the request is canceled in memory by another functional unit's assertion of an MCI signal and wherein the functional unit canceling the memory operation will thereafter fulfill the request by performing an out-of-order operation. As has been described, in an out-of-order response to a request the responding unit will arbitrate for access to the bus and when control of the bus is obtained, effectively couple together the operation of ADDR Bus 28, CMD Bus 30 and DATA Buses 26 by placing the requested information on the bus together with a command indicating that this is an out-of-order response and the address of the functional unit that submitted the request.

As has also been described, a requesting functional unit does not identify itself by transmitting its address or other identification when making a request for a single or multiple bus word or for a single or multiple cache line as the request is expected to be fulfilled as an in-order operation, as described previously. It is necessary for the out-of-order responder to identify the requester when executing the out-of-order response and this is performed through the arbitration mechanism. That is, while the requester does not transmit an identification of itself, the requester's slice number is available at each other functional unit of the system and an out-of-order responder which asserts an MCI to cancel the memory operation will read and store the requester's slice number, identified in FIG. 8 as Slice Number (SLICEN) from its ARBC 140, thereafter using that slice number as the requester's address when executing the out-of-order response.

Further details of the structure, function and operations of the arbitration mechanism may be found in the appendices pertaining to the functional units of System 10 and in Appendices 5, 10 and 11, respectively titled "Arbitration Logic—A, —B and —C".

8. Bridge Interface Controller 56

Figure 9:
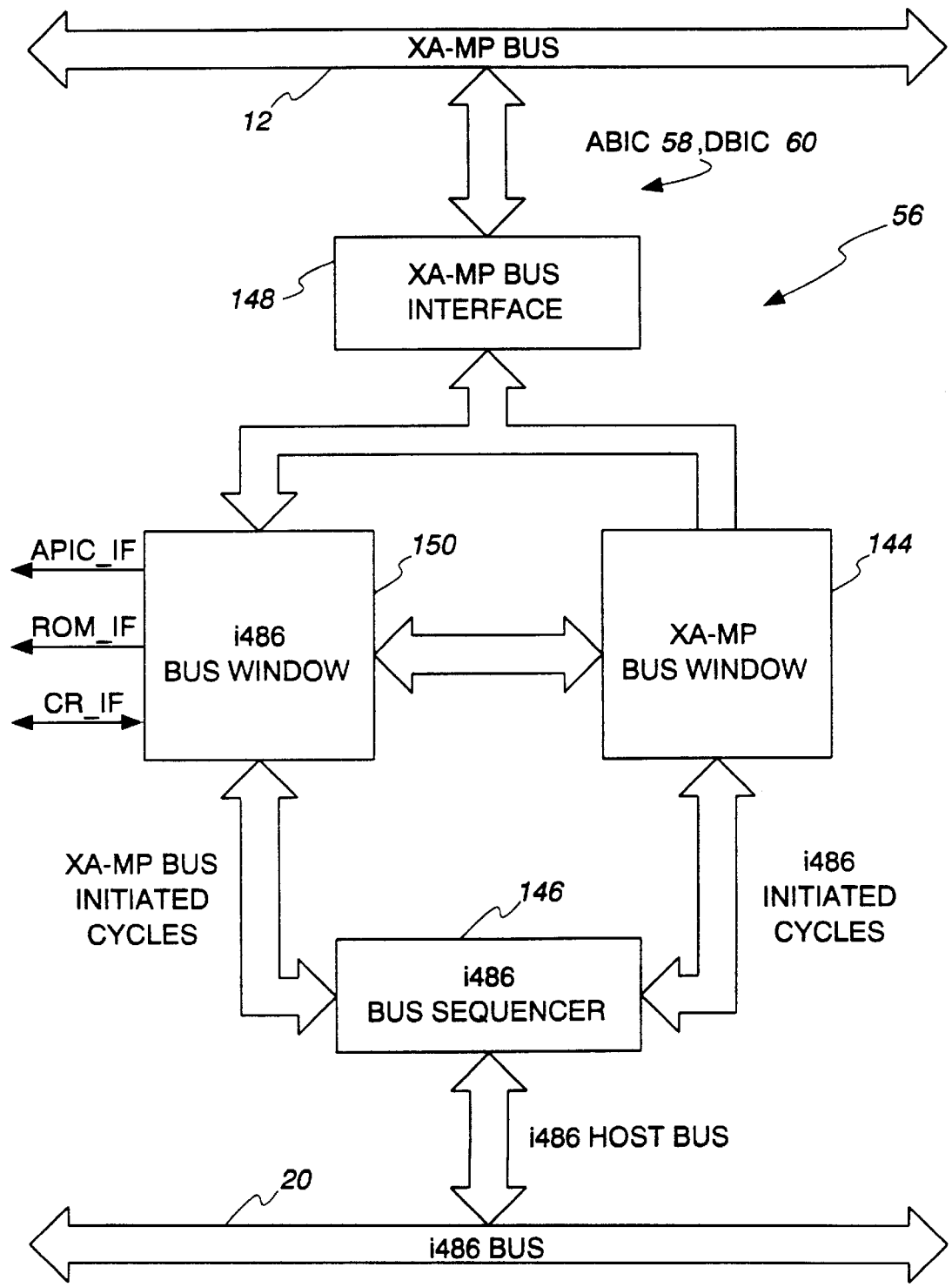
FIG. 9 is block diagram of an I/O bridge.

FIG. 9 presents a functional overview block diagram of the bridge interface controller 56 which interconnects the XA-MP bus 212 and the AS bus 20, which (in the preferred embodiment) is an Intel i486 bus identical to that which interconnects a conventional Intel i486 processor and its associated RAM memory to the other components of a standard personal computer system.

Figure 19:
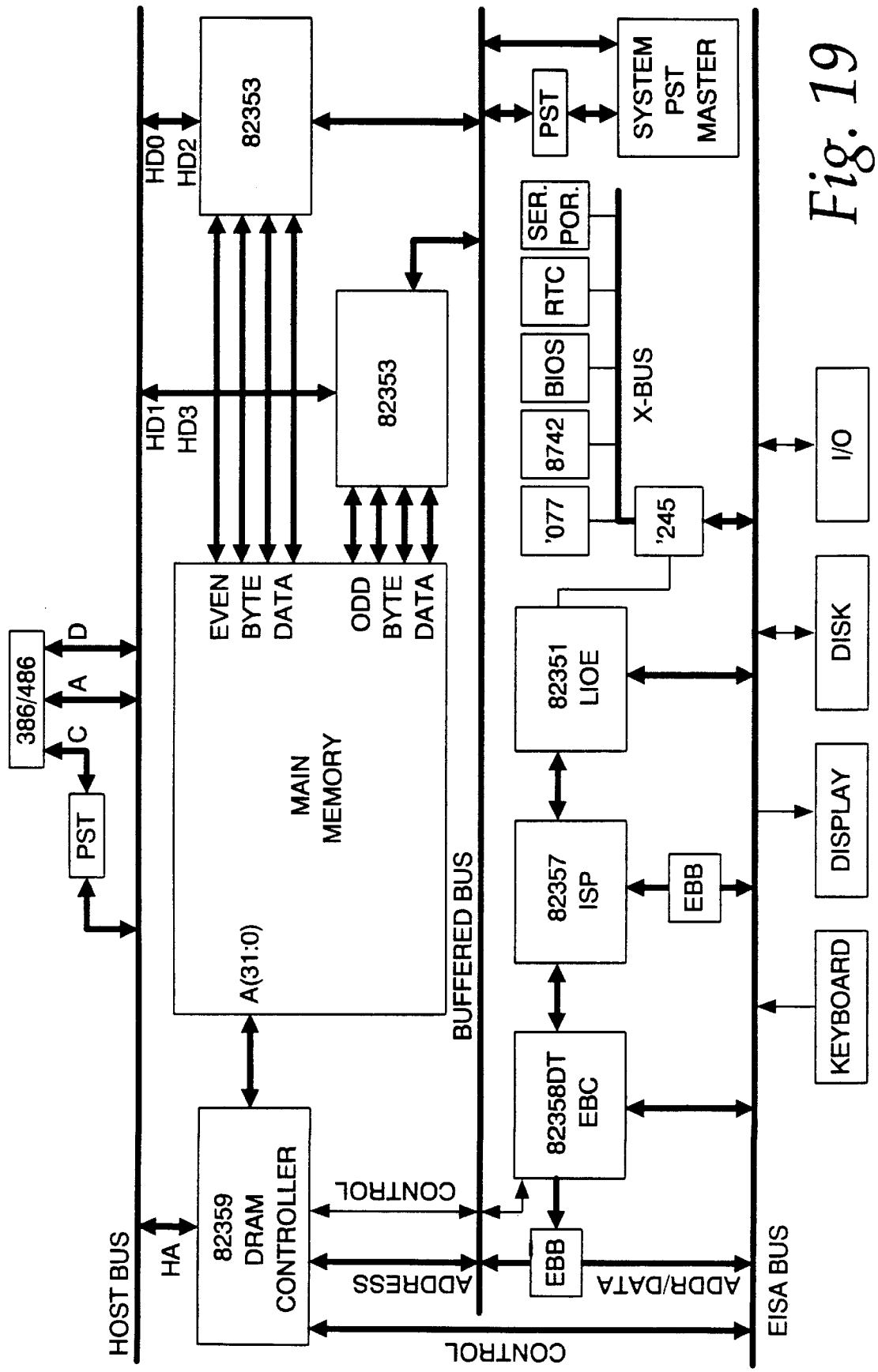
FIG. 19 is a block diagram of a personal computer.

The bridge interface controller 56 can be mounted on the mother board of a server workstation, where the AS bus 20 would connect to a conventional EISA or MCI PC-compatible I/O bus and controller system of the type used in conventional IBM PC compatible file servers and the like. Presumably, the motherboard would be equipped with EISA or MCI slots for accessory cards, such as local area network adapter cards. It might also drive an SCSI bus leading to one or more hard disk drive systems or other type of standard disk drive controller system. See, for example, FIG. 19 which presents a block diagram of a typical PC 142.

It is also contemplated that associated with the AS bus there will typically be standard PC support hardware, such as an interrupt controller, several direct memory access devices, and bus mastering hardware that permits accessory devices to gain access to and control of the AS bus 20. Most typically, direct memory access devices carrying out such tasks as disk reads and writes will, in response to data output commands received from the central processing units, set up direct memory access (DMA) reads and writes to and from the disk drives over the EISA or MCA bus controller and the bridge interface controller 56 to and from the main system RAM.

With respect to FIG. 9, functionally the bridge interface controller presents a XA-MP bus window to the AS bus 20 through which DMA controllers and other bus masters connected to the EISA or MCI bus can address data store and retrieval commands in precisely the same manner as if these commands were directed to the RAM memory associated with a conventional i486 microprocessor. These commands pass through a sequencer 146, through the window 144, and through a XA-MP bus interface 148 to the XA-MP bus 12, although many of these commands can be satisfied by reference to a cache (to be described) within the bridge interface controller 56 without any need to access the XA-MP bus 21.

The bridge interface controller also presents an i486 bus window 150 to the XA-MP bus 12 through which the multiple processors connected to the XA-NP bus 12 can access directly anything connected to the EISA or MCA bus, such as serial and parallel communication ports, VGA or other display adapters, and ROM-based program code. Such accesses are never cached but pass directly from the XA-MP bus 21 through the interface 148 to the i486 bus window 150 and the sequencer 146 to the AS bus 20 and to the various accessories beyond.

Figure 10:
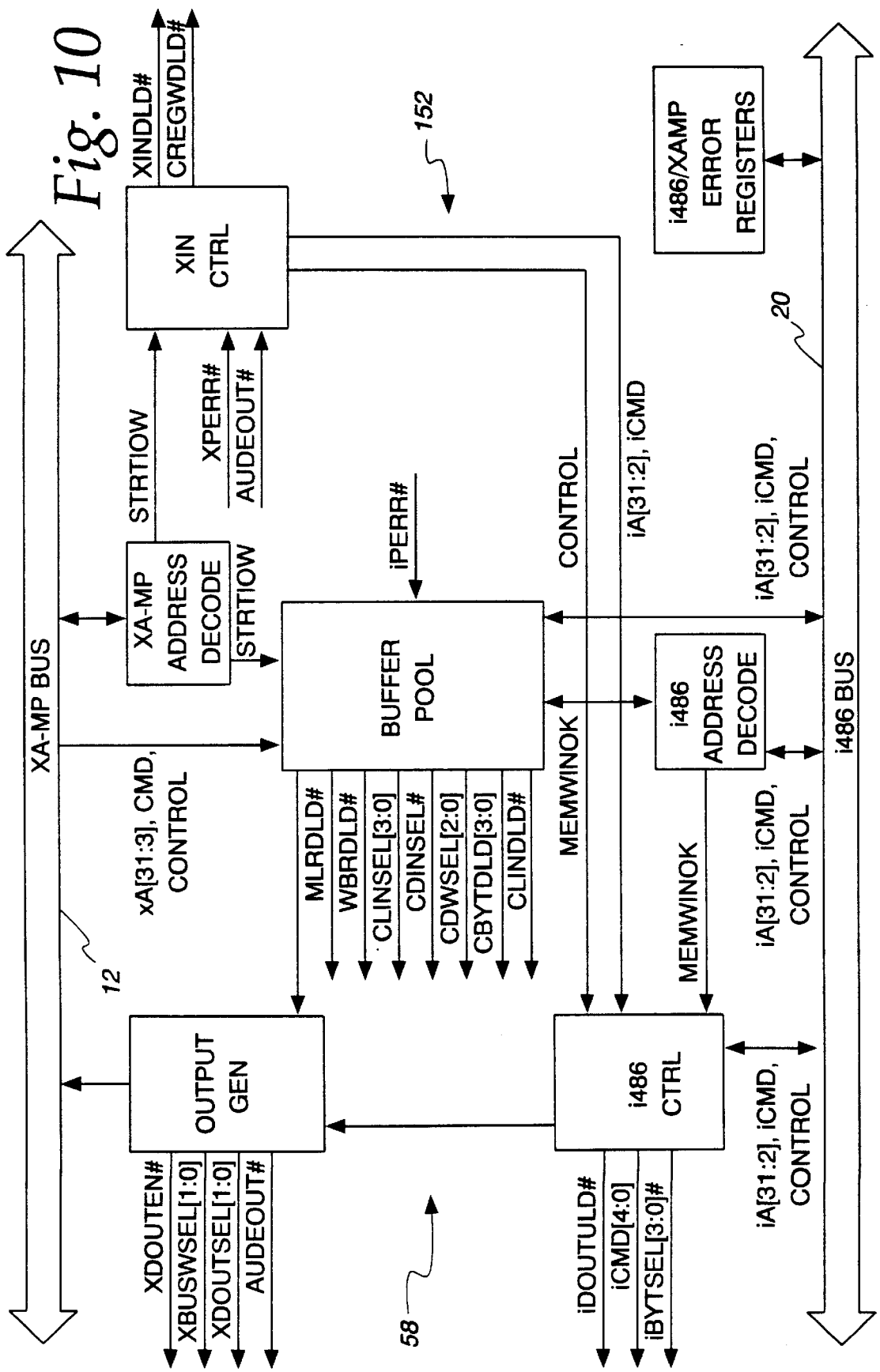
FIG. 10 is a block diagram of a bridge bus interface controller.
Figure 11:
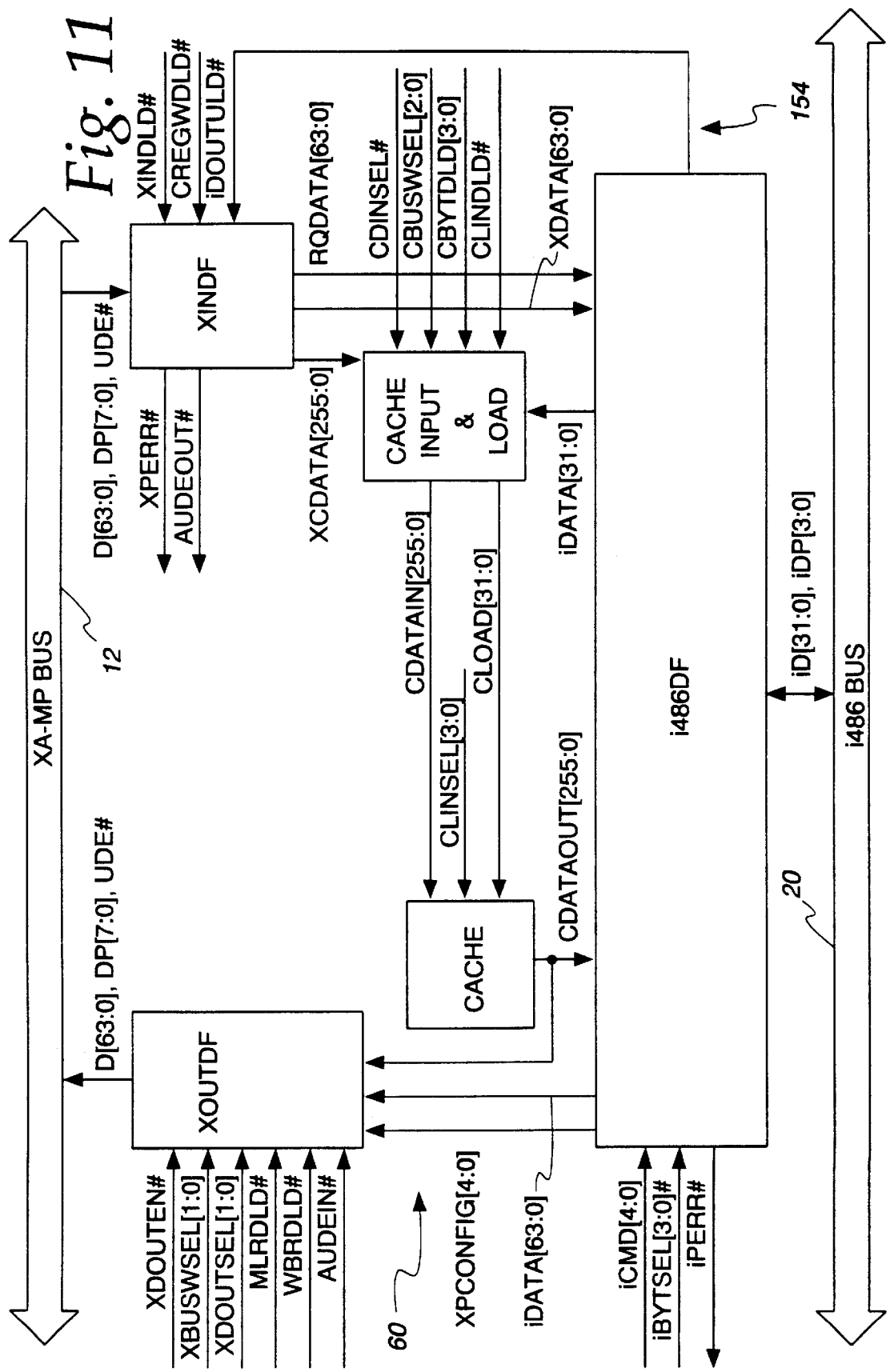
FIG. 11 is a block diagram of a bridge cache.

From a hardware point of view, the bridge interface controller is constructed from three LSI chips: an ABIC chip 152 (FIG. 10) and one or two DBIC chips 154 (FIG. 11).

Figure 12:
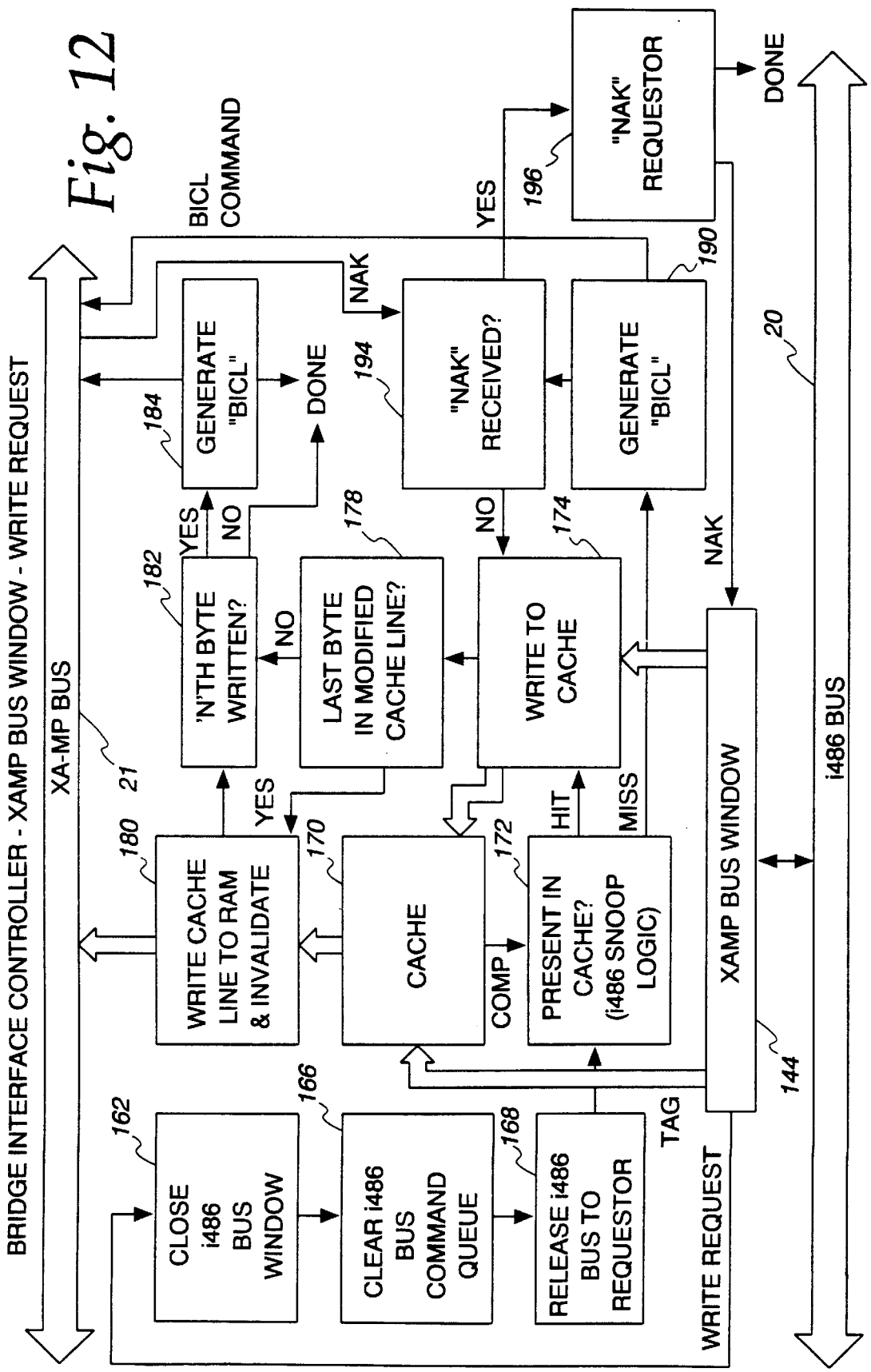
FIG. 12 is a block diagram of a bridge interface controller for a write request.
Figure 15:
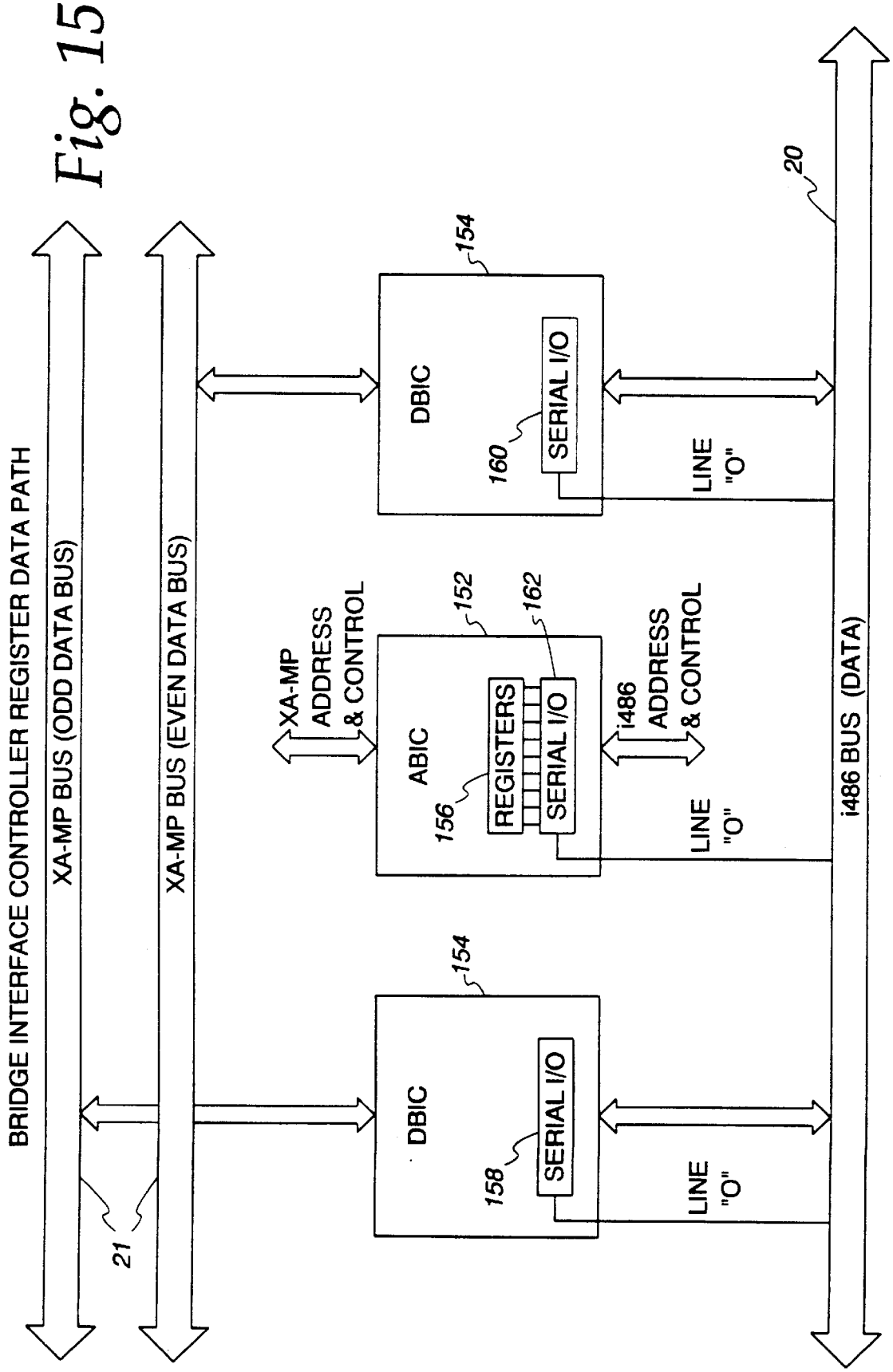
FIG. 15 is a block diagram of a bridge interface register data path.

These are connected to the busses 20 and 21 as is illustrated in FIG. 15. Each DBIC chip 154 connects to a respective one of the two data busses within the XA-MP bus 21, and both connect to the AS bus 20. Both contain cache memory, and the associated address tags are contained within the ABIC 152. The bus address and control lines connect primarily to the ABIC 152, which contains most of the bridge control logic. The state registers 156 which define the state of the bridge interface controller are also contained within the ABIC 152. Since these registers must be program accessible, serial I/O interfaces 158, 160, and 162 are provided whereby register values may be serially shifted between the DBICs 154 and the ABIC 152 over data line "0" of the AS bus 20 so that the registers 156 can be loaded from and unloaded to the data bus portions of the XA-MP bus 21. FIGS. 11 and 12 illustrate what elements are present on each type of chip. The remaining figures do not distinguish between the two types of chips, but consider the bridge interface controller to be a unitary device. An explanation of the signals seen in FIGS. 11 and 12 can be found in the Appendices.

FIG. 12 illustrates in a functional manner those elements of the bridge interface controller 56 that participate in the processing of data write requests originating from bus master or direct memory access devices residing beyond the AS bus 20 in the EISA, ISA, or MCA or SCSI bus system.

When an AS bus write request is received by the XA-MP bus window 144, the bridge interface controller 56 first closes the i486 bus window 150, temporarily cutting off CPU access to the AS bus (step 162). Any pending CPU commands (stored in a i486 command queue 164 shown in FIG. 14) are promptly executed and cleared out (step 166). Next, the bridge interface controller 56 releases the AS bus 20 (step 168) for use by the DMA or bus master or other device.

Next, if it is a write request, a cache 170 is tested to see if it contains a cache line corresponding to the specified address (i486 snoop logic 172). The tag portion of the address presented to the window 144 is fed into the cache 170 and a compare signal signals to the snoop logic 172 whether the line of data exists within the cache 170. If the line is present, then a HIT signal causes a write to cache operation (step 174) to be carried out. If that is the last byte in the cache, and assuming that this cache line contains modified bytes (as marked by modified bits 174 shown in FIG. 16—step 180 in FIG. 12), then at step 180 the cache line is automatically written back to RAM and is freed up for use to receive a later incoming cache line of data, assuming a multiple byte or word transfer is in progress. By thus freeing up a cache line as soon as it is full of incoming data, the data input process is confined to two cache lines and does not overwrite the entire cache, thereby interfering with other input or output transfers that may be in progress simultaneously. The cache thus functions as if it were a buffer for incoming memory write requests, yet behaves as an I/O cache at other times and for the central processing units, as will be explained.

Finally, at step 182, an optional test can be carried out to see if the "n" th byte in the cache line (where "n" is adjustable) has been written. If it has, and we are nearing the end of this cache line, the controller 56 at 184 generates a "BICL" command, which is sensed by all the other caches associated with the multiple processors. If any of those caches contains a modified copy of the next sequential cache line modified, this "BICL" command causes them to write the modified line back to RAM and to mark their cache entries "invalid". Likewise, any caching unit cache that contains an unmodified copy of this next sequential change line mark their cache entries "invalid." This "BICL" command ("Bridge Invalidate Cache Line" command), without the need for a data transfer, thus sets up the system to receive data bytes in the bridge cache. If any central processing unit attempts to access this same cache line while it is being loaded with incoming data, snoop logic 186 (FIG. 16) associated with the XA-MP bus detects that this cache line is marked "modified" and NAKs the memory request attempt until, at step 188, the altered bytes are restored to RAM memory (by WBW commands, with the memory merging the altered bytes with the remainder of the cache line).

If the cache line is not already present within the cache 170, as indicated by the snoop logic 172 generating a MISS, then a BICL command is generated at 190 to insure that only RAM has an updated copy of the cache line, and at step 174 the incoming data is written into an empty cache line in the cache 170, marked with its readability bit 192 (FIG. 16) set to indicate it contains some undefined data and with the appropriate ones of its modified bits 176 (FIG. 16) set to indicate which are the new, incoming data bytes and which are invalid bytes. But if some other cache contains a modified copy of this particular cache line, the snoop logic 186 associated with that particular cache generates a NAK signal (detected at 194) to give the cache unit time to return the modified value to RAM. The peripheral device is stalled until the BICL is accepted and the modified value has been returned to RAM. In most cases, the steps 182 and 184 will have caused the BICL command to go out at an earlier time, so that this NAK and the subsequent delay will not occur.

Figure 13:
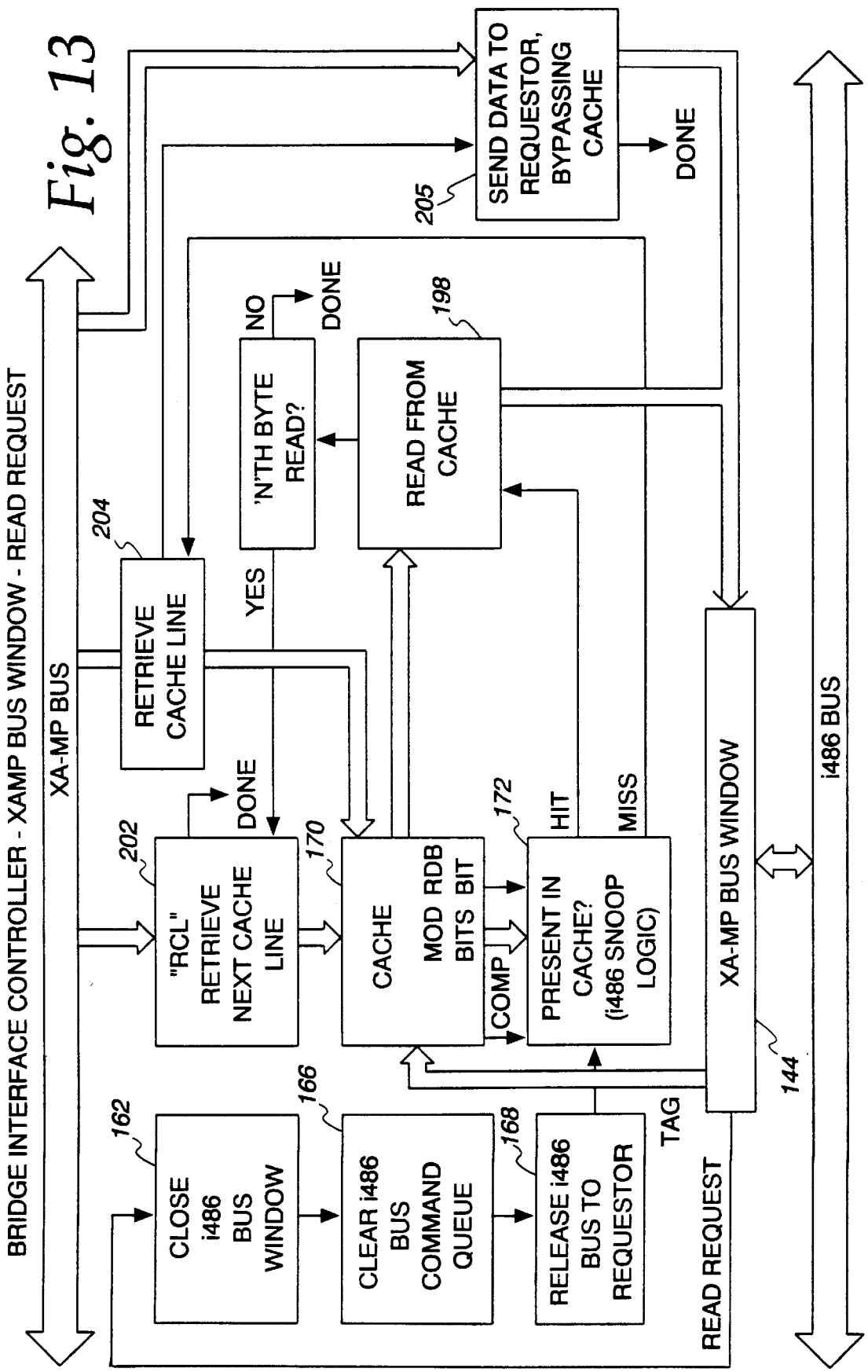
FIG. 13 is a block diagram of a bridge interface controller for a read request.

FIG. 13 illustrates in a functional manner those elements of the bridge interface controller 56 that participate in the processing of data read requests originating from bus master or direct memory access devices residing beyond the AS bus 20 in the EISA, ISA, or MCA or SCSI bus system.

Next, in the case of a read, a cache 170 is tested to see if it contains a cache line corresponding to the specified address (i486 snoop logic 172). The tag portion of the address presented to the window 144 is fed into the cache 170 and a compare signal signals to the snoop logic 172 whether the line of data exists within the cache 170.

If the cache line is present, then a HIT has occurred, and step 198 transfers the requested data from the cache to the waiting device. At step 200, if the "n"th byte, where "n" is adjustable", has just been read, then optionally at 202 a RCL command is issued to cause the next successive cache line of data to be retrieved from RAM (or from some cache where it exists in modified form). If the cache line data is not present, then a MISS occurs, and step 204 initiates an RCL command that retrieves the cache line from RAM memory (or from some other cache where it has been modified). To save time, at the same time the new cache line is loaded into the cache it also bypasses the cache and proceeds directly to the requesting device over a parallel path (step 205).

Figure 14:
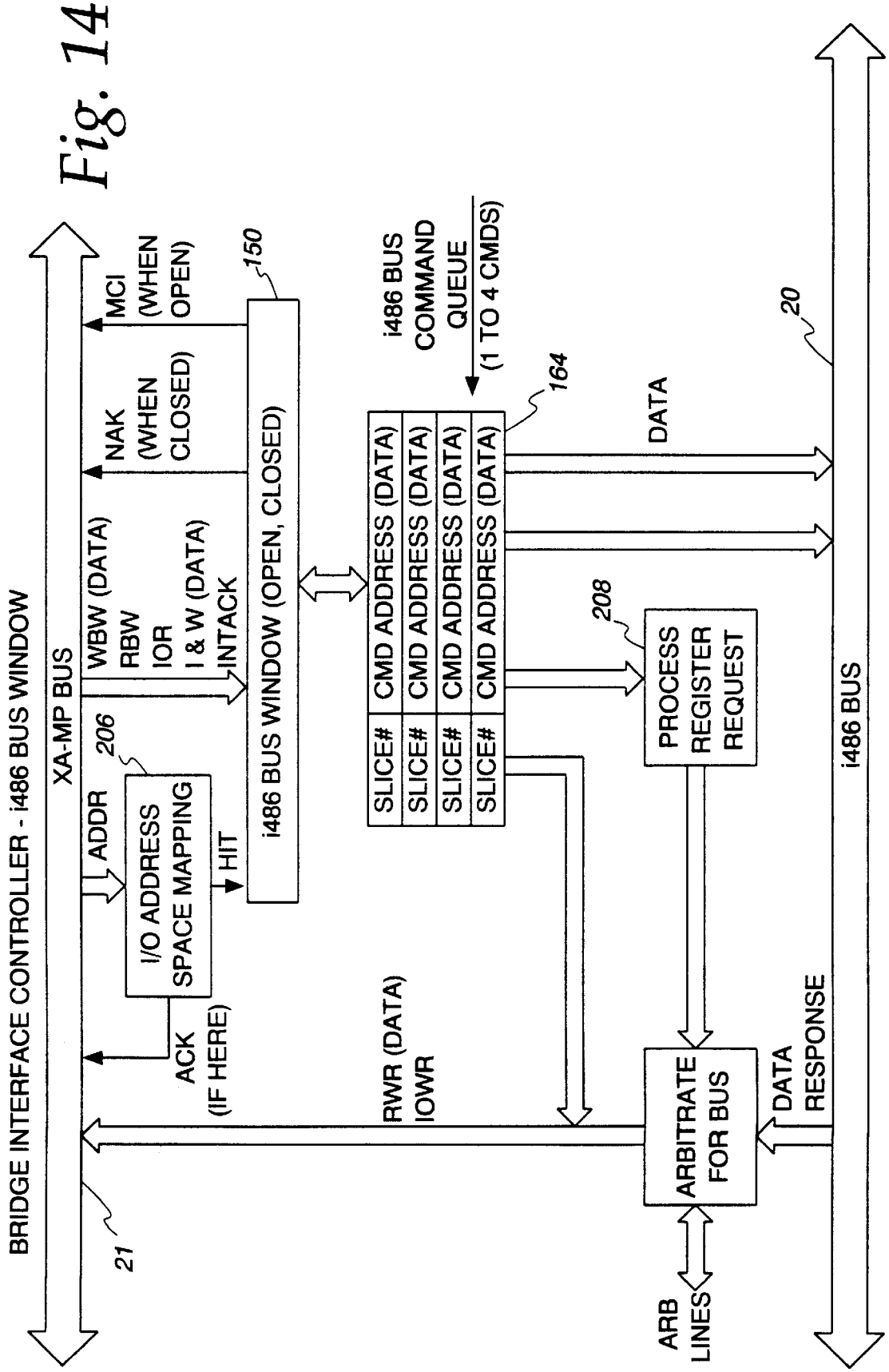
FIG. 14 is a block diagram of a bridge controller for a bus window.

Data reads and writes initiated by the multiple CPUs and directed at devices beyond the bridge interface controller are directed to the i486 bus window 150 shown in FIG. 14. These requests may be of two types: actual CPU I/O requests, which require acknowledgment in the case of writes, and CPU memory read and write requests that are to be mapped into the AS Bus 20 address space in some manner. The preferred embodiment, at 206 in FIG. 14, includes a variety of such AS Bus 20 address space mappings, including the following:

ISA compatible mapping of the lower few megabytes of RAM memory to the memory address side of the AS bus address space, such that blocks of memory in 4K, 16K, 64K, and 1 Meg sizes can be marked read only (read AS bus, write to RAM), write only (write to AS bus, read from RAM), read/write (reads and writes to AS bus), and RAM only (no AS action). This enables ROM to be shadowed in RAM, some RAM in AS bus space to appear amidst RAM generally, as is required for VGA and EGA video graphics controllers, and RAM used for shadowing to be effectively made read only. Also, access to some RAM can be switched on and off as needed by various PC ROM BIOS programs.

The need for all of this will be apparent to all those skilled in the design of IBM PC compatible computer systems and needs not be explained here in detail.

Four relocatable windows are also provided that map very high memory addresses (above the starting address in the base register "relowin_base") into two 4 MB and two 8 MB windows in AS address space. This facilitates the use of video graphics controllers without interfering with the operating systems which require all of the lower 16 MB of memory for their own purposes.

Another window, variable in size from 16 bytes to 4 gbytes, maps XA-MP memory address cycles into AS bus I/O address space cycles. This window is defined by the registers "begin-con" and "end_con".

All of these AS address mappings and Read only, Write only, (etc.) characteristics are defined by values stored within the registers 156 (FIG. 15) that result in the AS bus address mapping 206 (FIG. 14) which causes the i486 bus window 150 to recognize and to intercept memory and I/O read and write requests addressed to the devices beyond the bridge interface controller 56 and to intercept those requests.

XA-MP bus accesses into the AS bus address space are simply accepted, ACKed and MCIed, and processed (if they are not NAKed because the command queue 164 is full or because the i486 bus window is closed pending action following steps 162 in FIGS. 12 and 13 when a DMA or bus master data transfer is occurring). An MCI cancels any response by normal RAM and advises the CPU making the request that the response will be an "out of sequence" response.

Up to four such requests may be queued up in the bus command queue 164 along with the slice number of the requesting central processing unit. The commands are applied to the AS bus 20. When a response comes back, the bridge controller 56 arbitrates for the main bus (and gains it quickly, since it is assigned the highest priority. Next, it generates an RWR command addressed to the requesting slice and accompanied by the returned data; or, in the case of an I/O address space write, it simply sends out the IOWR (I/O write response) command using only a bus address cycle and no data cycles.

For IBM-PC compatibility, some bridge interface controllers can be designed to respond to an interrupt acknowledge command. When an i486 or Pentium processor from among the multiprocessors acknowledges a hardware interrupt and calls for the interrupt number, the MBC 50 generates an INTA command which is passed to the AS i486 bus as if an i486 bus were acknowledging an interrupt and requesting the interrupt number. The interrupt number, returned by the EISA or MCI logic, is then passed back to the MBC 50 in the form of an RWR command with the interrupt number as data, and is ultimately presented to the Pentium or i486 that needs it.

Bridge interface controller register access commands are processed by step 208 as shown in FIG. 15.

9. Cache Snoop Logic

Figure 16:
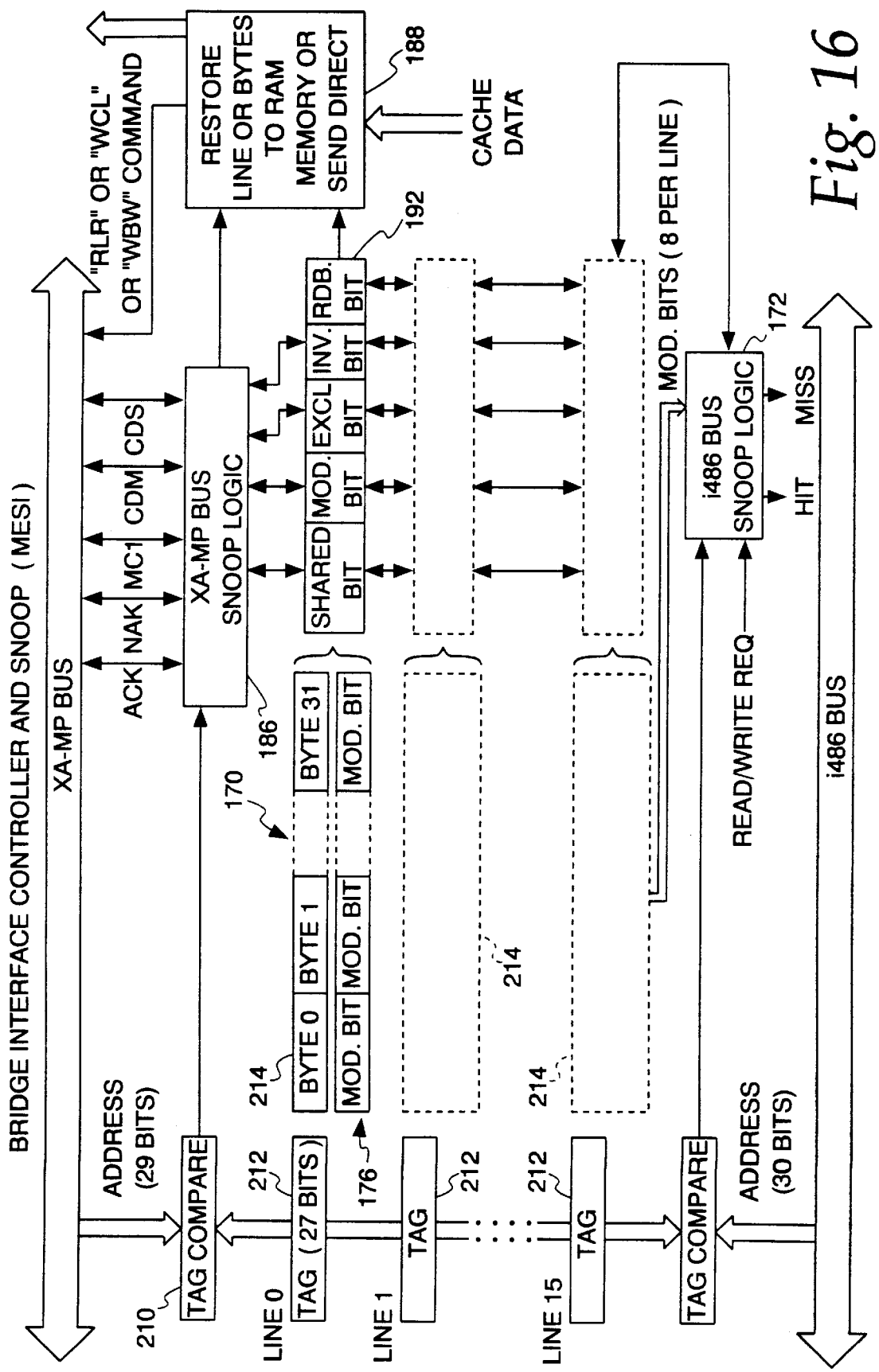
FIG. 16 is a block diagram of a bridge interface controller and snoop.
Figure 17:
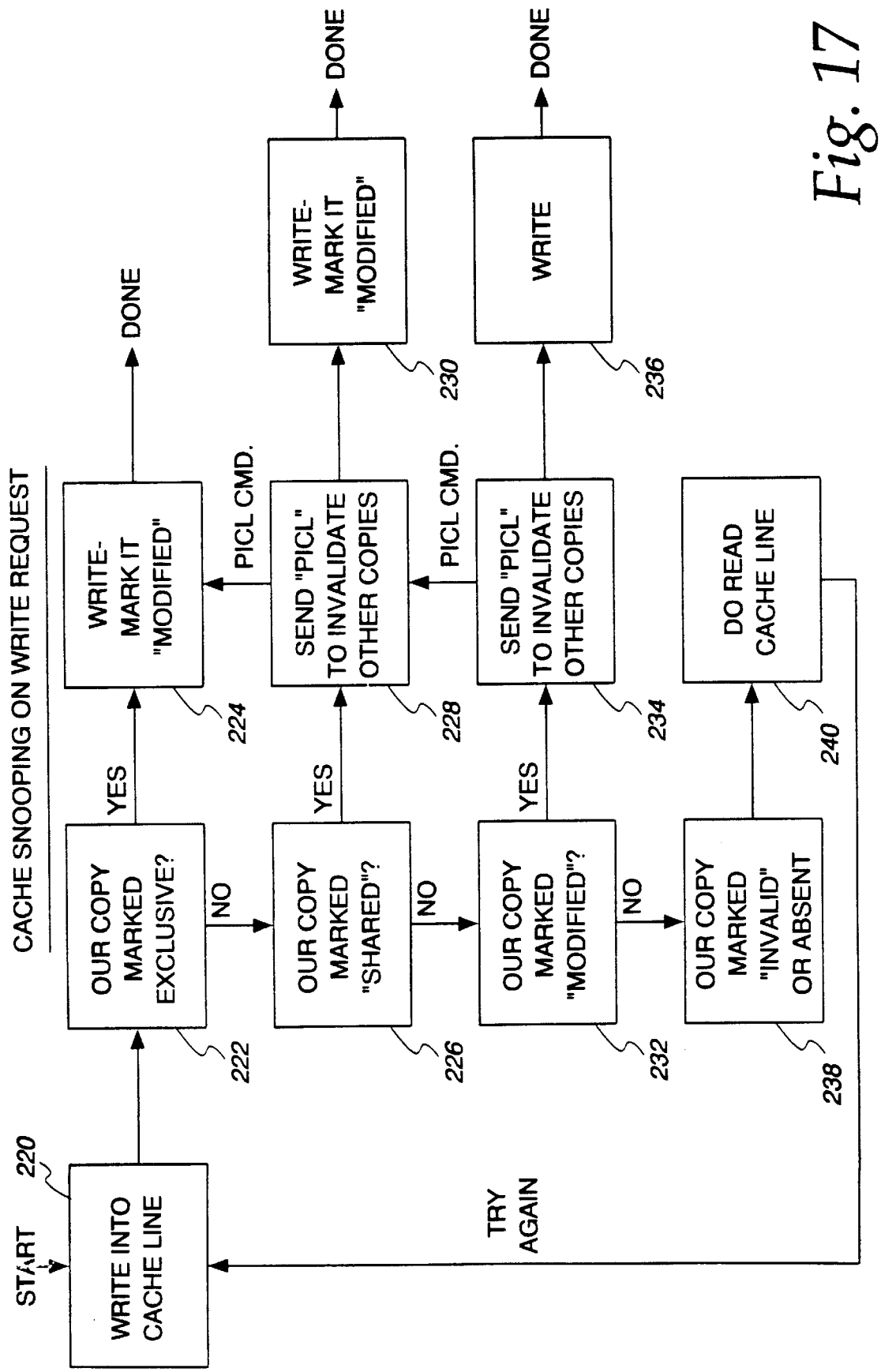
FIG. 17 is a flow chart of snooping on a write request.
Figure 18:
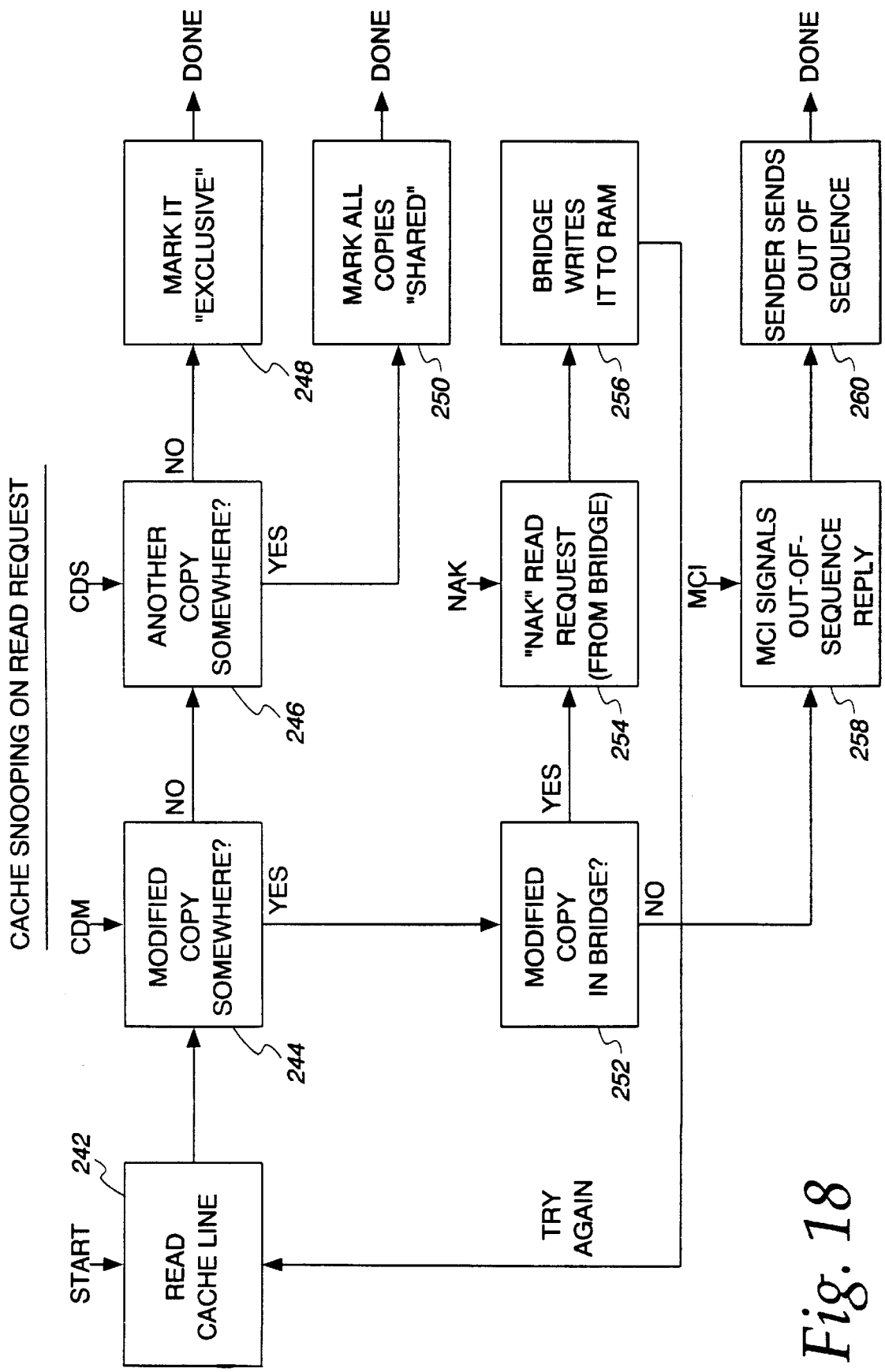
FIG. 18 is a flow chart of snooping on a read request.

FIGS. 16, 17, and 18 illustrate the structure (FIG. 16) and functional operation (FIGS. 17 and 18) of the MESI cache snooping protocol that enables multiple CPU and bridge interface controller caches to function simultaneously and cooperatively in a symmetric bus caching system in which no one party ever owns a cache line. It thus differs from prior MOSI system (where Ownership is replaced by Exclusive access, which means sole but not exclusive access to a cache line).

The convention is as follows: A cache can contain no copy of a cache line; or it can be the Exclusive (meaning only)

cache to contain a particular cache line; or, if others also contain a copy, it can be Sharing access to a cache line; or, if the cache line has been altered, it is a Modified cache line and no one else can have it; or, if someone else Modifies their copy, we mark our copy Invalid as if we did not have it, freeing the space for reuse, and sending modified data back to memory.

Accordingly, each cache line is accompanied by flag bits M (for "modify"). E (for "exclusive"); S (for "shared"); and I (for "invalid"). And as shown in FIG. 16, the signals ACK (for "I have it"), NAK (for "try again later"), MCI (for "it will come to you out of sequence"), CDM (for "I have it modified") and CDS (for "I am sharing it") are sent to all of the slice devices that have caches. These enable the caches to snoop each other's contents as addresses are presented on the XA-MP bus 21.

As illustrated in FIG. 16, each cache contains tag compare logic 210 that is able to compare the tag portion of any XA-MP bus address with the tags 212 contained within the local cache 170, providing a compare signal to the XA-MP bus snoop logic 186 if the address exists within the cache 170. The XA-MP bus logic 186 first generates an ACK signal (although the RAM memory may do this; then the snoop logic 186 examines the MESI bits 192 and signals as follows:

if the Exclusive bit or Shared bit is set, it generates the CDS signal;

if the MOD bit is set, it generates the CDM signal, and also the MCI signal to signal that step 188 will send the modified cache line back by an out-of-sequence cache-to-cache RLR transfer (but the bridge controller cache NAKs the request and sends the altered data to RAM using a WCL (if all data is valid) or one or more WBWs (if some is invalid), NAKing until this is done, and then marking the cache line invalid;

otherwise there is no response.

The cache associated with the bridge interface controller differs from the others in that it has the modified bits 176 indicating which bytes are valid data and the readability bit 192 indicating whether the cache line contains only fully readable data (as during output to peripheral device operations). The step 188, in the case of CPU caches, transfers modified data cache to cache using an out of order RLR transfer; and in the case of bridge controller transfers, transfers modified data back to RAM and NAKs the requesting processor. The bridge controller cache also works as a cache to peripheral devices, as indicated at 172 in FIG. 16 and in FIGS. 12 and 13, but it is modified as explained above to function more as a buffer for DMA transfers into RAM and the like.

a) Write Cycles

The cache snooping operations are summarized in FIGS. 17 and 18: For a CPU cache, in response to a write into a cache line 270, the local cache snoop logic 270 checks to see if the local copy is marked "Exclusive" at 222; and if so, at 224, it is marked "Modified." Nothing more needs to be done, since no other cache contains a copy. No XA-MP bus address or data cycle is required.

At 226, if it is marked "shared," then a "PICL" command is sent out to the other snoop logic units to invalidate other copies of this data that exist in other caches, and again it is marked "Modified". All other copies are marked "Invalid" by their local snoop logic. This takes only a XA-MP bus address cycle and no data cycles.

At 232, if it is marked "Modified," the same steps are taken. Note that the PICL command can detect incoherency errors, since no one else should have a "modified" or "exclusive" copy.

At 238, if our local cache copy is invalid or missing, then one does a RIL and returns to step 220 and re-tries to write into the cache line.

For a bridge cache, the local cache snoop logic 270 checks to see if the local copy is marked "Modified". If it is, nothing more needs to be done.

IF it is not marked "Modified", a BICL command is sent to the other snoop logic units to invalidate other copies of this data that exist in other caches, and it is marked "Modified".

This forces the cache containing the modified data to NAK and to send the data back to RAM (see steps 184, 190, 194, and 196 in FIG. 12).

For CPU caches, the modified data is not returned to RAM until it is forced out of the local cache by some new transaction. Then it is moved into the cache writeback register (where it is still in the active cache) and it is sent back to memory by a WCL request.

b) Read Cycles

Read requests, where the data is not present in the local cache (FIG. 18, step 242), begin with execution of the RCL read cache line command. The RAM memory ACKs if the address is valid. The snoop logic 186 in all of the caches examines the address and the local cache for a collision, and then checks the status of the MESI bits if there is a hit. The CDM signal signifies that a modified copy exists in some cache; the CDS signal signifies that an unmodified copy exists somewhere. If there is no CDM or CDS response (steps 244 and 246), then the returned cache line is marked Exclusive at 248. If another copy exists somewhere (step 246), then all copies are marked "Shared." If a modified copy exists in a CPU cache (step 252), then the cache containing the modified copy responds with the MCI signal (step 258) and initiates an out-of-sequence transfer of the modified cache line directly cache to cache at step 260. A quick sequence of such requests for the same modified value can cause a waterfall effect where it is transferred rapidly from cache to cache, only one cache (the last one) having its "Modified" signal set.

If the cache containing the modified value is a bridge controller cache (step 252), the data is probably just arriving from a DMA transfer into RAM. In this case, the read cache line request is NAKed by the bridge controller snoop logic, and the modified data is written into RAM (step 256 in FIG. 18 and step 188 in FIG. 16).

Further details of the bridge I/O logic and operation may be found in Appendix 9, titled "Bridge Interface Controller".

10. Processor Modules 16

The above described features, structures and operations of System 10 are implemented in essentially all functional units of the system, so that principle operational features of PMs 16 will be understood from the above discussions and from the relevant appendices pertaining to the elements of PMs 16, which include Appendix 6, titled "Memory Bus Controller", and Appendix 7, titled "Processor Data Path".

The following will therefore describe PMs 16 at a summary block diagram level, to aid in comprehension of the relevant appendices and the relationship of the features of PMs 16 to the previously described features of System 10.

Figure 20:
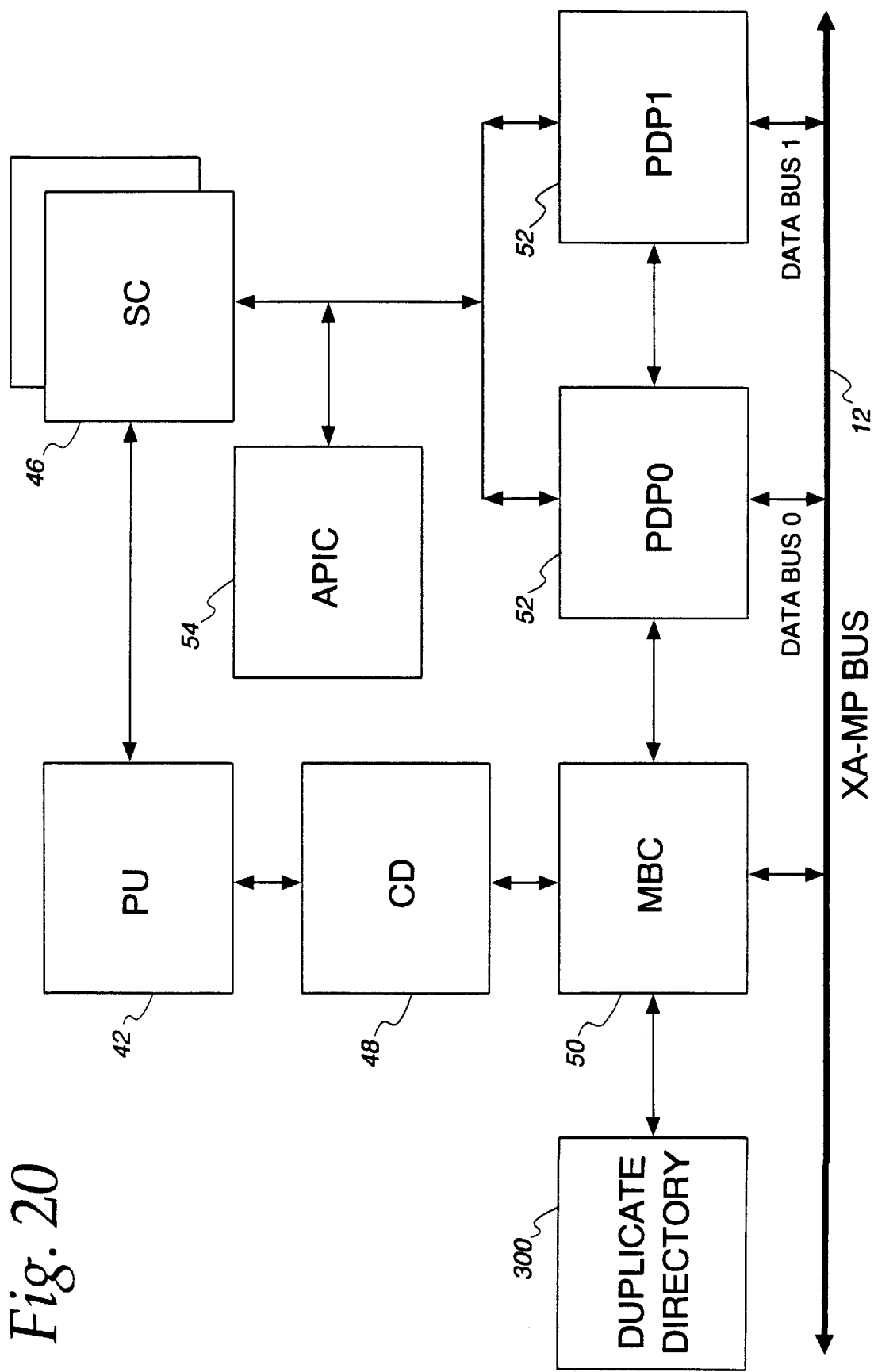
FIG. 20 is a block diagram of a processor functional unit.

Referring to FIG. 20, therein is present an overall block diagram of a PM 16, as shown, and as discussed previously, each PM 16 includes a Processing Unit 42 which includes a primary cache supporting data and instruction reads and writes for the Processing Unit 42 in association with Secondary Cache Mechanism 46 and a Secondary Cache Directory 48 for support of direct Processor Unit 42 operations. It should be noted that Processor Unit 42 is designated by the title P5 and the Cache Directory 48 and Secondary Cache 46 by the titles C5C and C8Cs in the Appendices in reference to the presently preferred implementation of PMs 16 wherein P5 is a Pentium microprocessor and C5C and C8C are associated cache mechanisms from Intel Corporation and are referred to by these titles in the appropriate product documentation.

Each PM 16 further includes an Advanced Processor Interrupt Controller (APIC) 54 for interrupt handling and a Duplicate Directory 300 for storing a duplicate of the tag directory of Cache Mechanism 44 for use in snooping operations.

Each PM 16 also includes, as previously described, an MBC 50 for controlling PM 16 operations with respect to XA-MP Bus 12 and two data paths in the form of two PDPs 52, one for the even Data Bus 26 and one for the odd Data Bus 26.

a. Memory Bus Controller 50

Figure 21A:
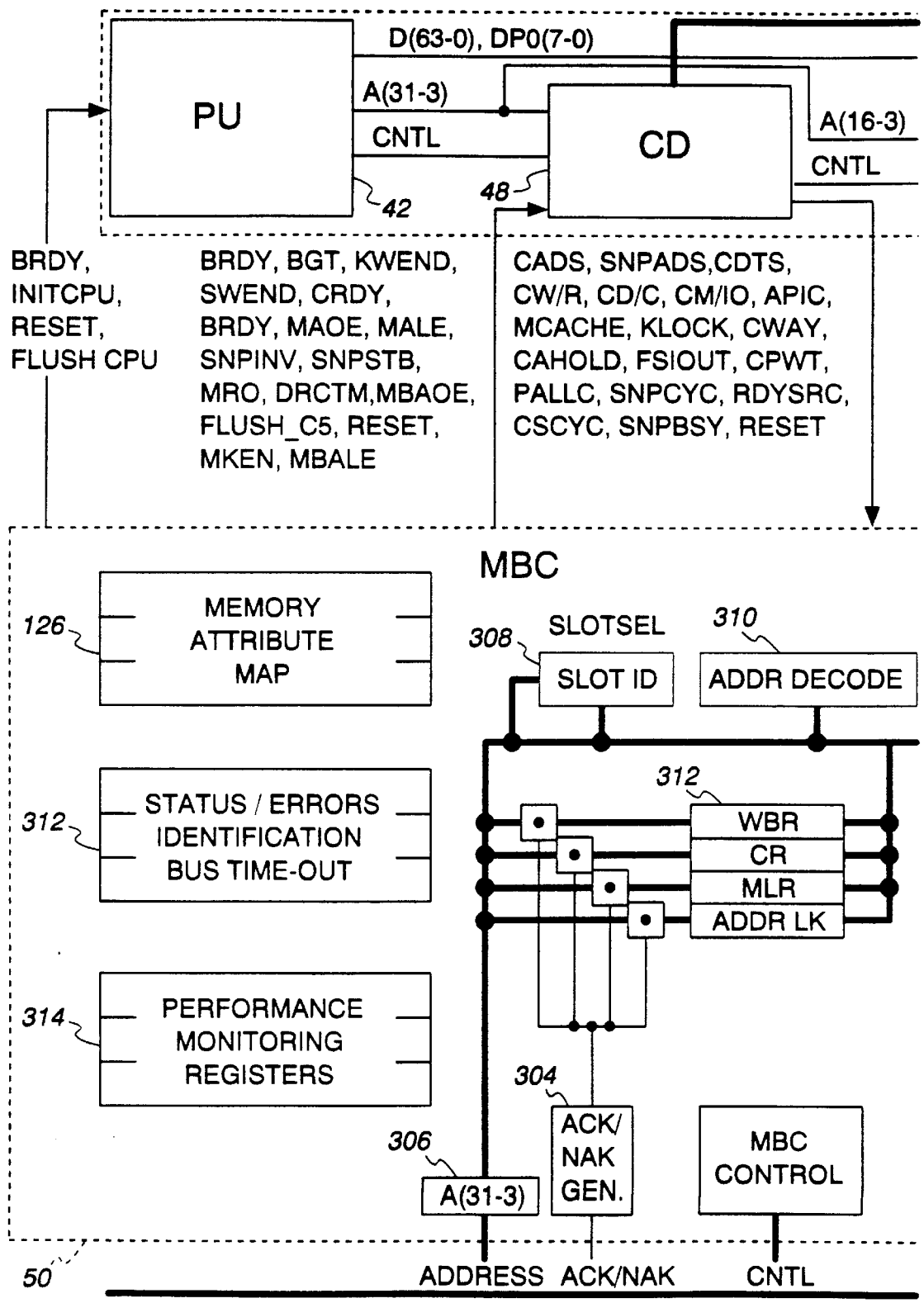
FIGS. 21A and 21B is a block diagram of a memory bus controller.
Figure 21B:
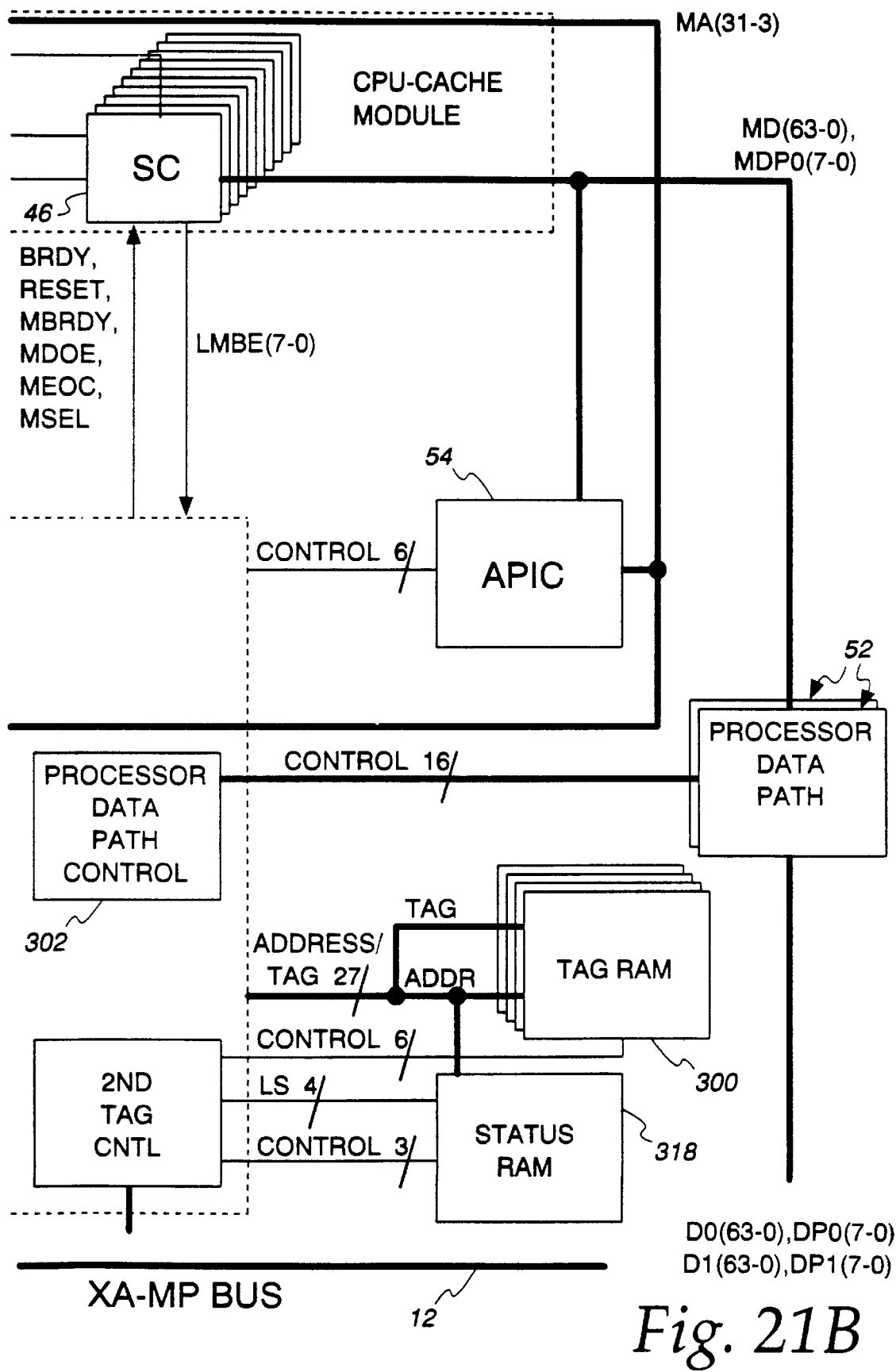

Referring now to FIGS. 21A and 21B, therein is illustrated a further block diagram of PM 16 with greater emphasis on MBC 50. As shown therein, MBC 50 includes a Processor Data Path Control 302 for controlling PDPs 52, an ACK/NAK Generator 304, an Address Register (A) 306, a Slot ID 308 for storing the slice's slice number, and an Address Decode mechanism (ADDR Decode) 310.

MBC 50 further includes a set of Control Registers 312 and an ADMP 126, a set of status and identification registers 312, and performance monitoring registers 314. MBC 50 also includes a $2^{nd}$ Tag Controller 316 for controlling Duplicate Directory 300, indicated as "Tag RAM" and has an associated Status RAM 318 for storing status information.

Figure 22:
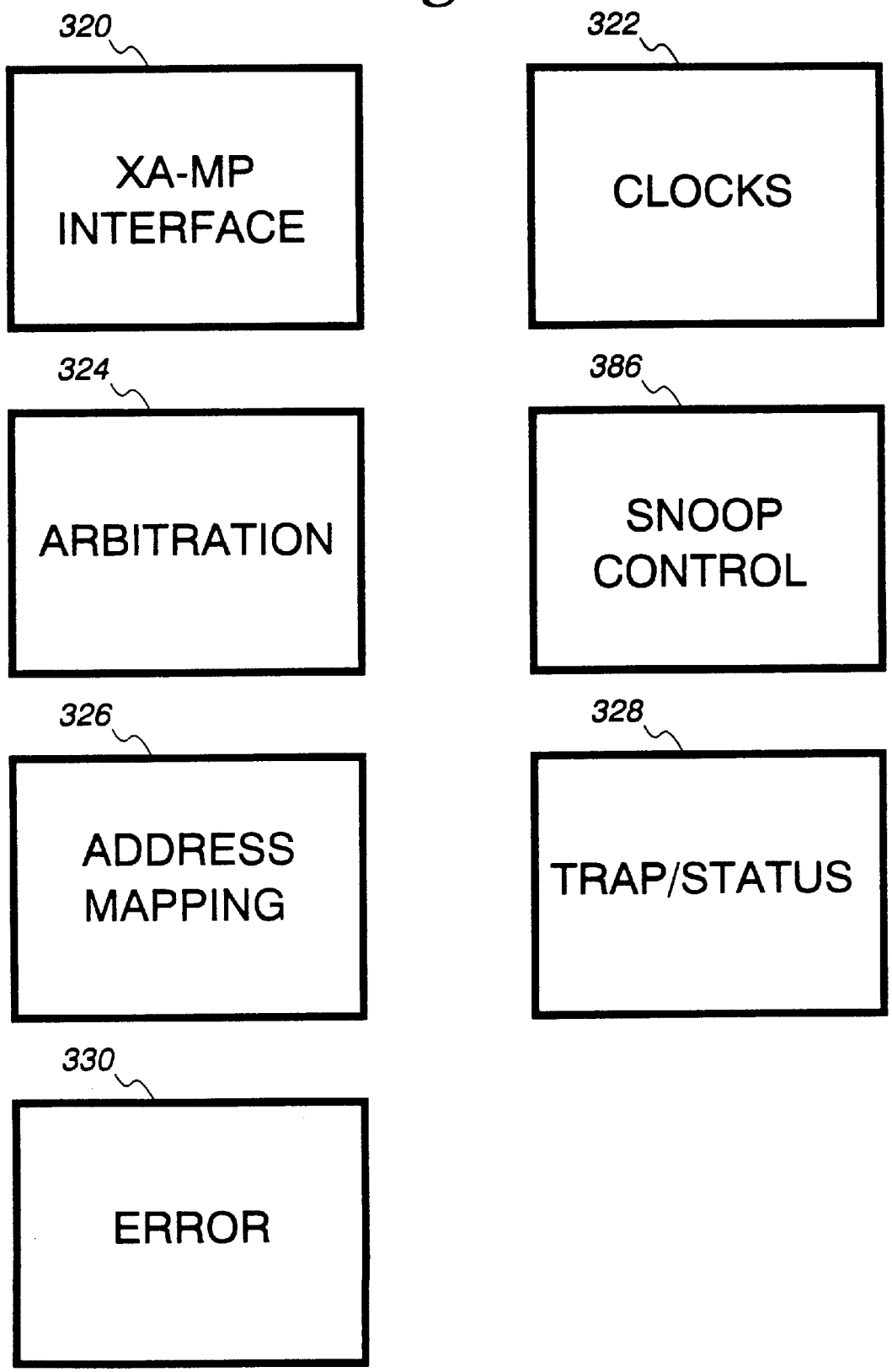
FIG. 22 is a block diagram of a memory bus controller control structure; and, FIG. 23 is a block diagram of a processor data path.

Referring to FIG. 22, MBC 50 further includes various control logic functions which include XA-MP Interface Control 322, a Clock generator 322, Arbitration Logic 324, Snoop Control Logic 186, Address Mapping Control 326, Trap/Status Logic 328 and Error Logic 330, each of which is discussed elsewhere and, in particular, in Appendix 6, titled "Memory Bus Controller".

b. Processor Data Path 52

Figure 23:
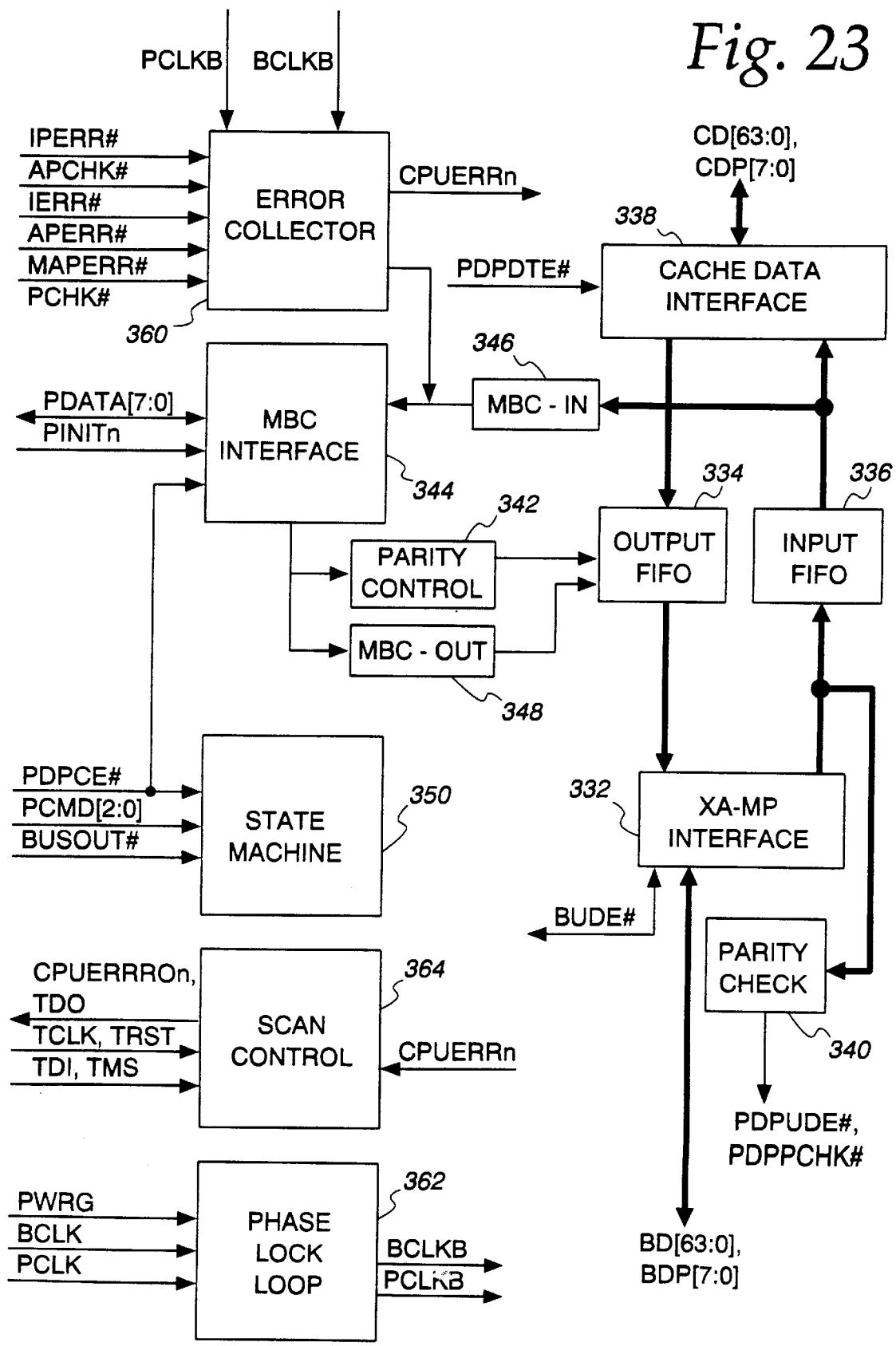

Referring now to FIG. 23, therein is shown a block diagram of a PDP 52. As shown, PDP 52 is comprised of a data path which includes an XA-MP Bus Interface 332 to XA-MP Bus 12, an Output FIFO 334, an Input FIFO 336 and a CACHE-DATA Interface 338 to Cache Mechanism 44. Associated with the input data path is an input data Parity Check 340 and associated with the output data path is an output Parity Control 342.

The interface between the PDP 52 and the MBC 50 is provided through MBC Interface 344, MBC-IN 346 and MBC-OUT 348. Operation of the PDP 52 is provided by a STATE MACHINE 350.

The PDP 52 further includes an ERROR COLLECTOR 360, a PHASE LOCK LOOP 362 for providing clock signals, and SCAN CONTROL 364.

Further details of the structure, operations and functions of a PDP 52 may be found in other descriptions herein, including Appendix 7, title "Processor Data Path".

The above completes a description of a presently preferred embodiment of the present invention. It will be noted that the invention described above may be embodied in yet other specific forms without departing from the essential characteristics thereof. Thus, the present embodiments are to be considered in all respects as illustrative and not restrictive, the scope of the present invention being indicated by the appended claims rather than by the foregoing description, and all changes and modifications which come within the meaning and range of equivalency of the claims are therefore intended to be embraced therein.

What is claimed is:

1. A data processing system including one or more functional units containing addressable storage locations, the data system processing system comprising means in each of said one or more functional units for mapping addresses of the system's address space to the addressable storage locations of the one or more functional units, said mapping means including means for mapping one or more mapping entries before system initialization of said data processing system;

means for storing said one or more mapping entries, each of said one or more mapping entries corresponding to at least one addressable storage location in said one or more functional units, and to at least one address of the address space of the system, and containing information relating the at least one address of the address space of the system to the at least one addressable storage location in said one or more functional units; and means responsive to an address to read a corresponding mapping entry from the address map means and determine the corresponding storage location in said one or more functional units.

2. The data processing system of claim 1 wherein each said one or more mapping entries further contains information for particularly identifying the corresponding functional unit's storage location.

3. The data processing system of claim 1, wherein at least one of said functional units includes a memory module.

4. The data processing system of claim 1, wherein at least one of said functional units includes a processor module.

5. The data processing system of claim 1, wherein at least one of said functional units includes a bridge module.

6. The data processing system of claim 1, wherein each information storage function in one of said functional units is related to a bus operation.

7. The data processing system of claim 1, including means for displaying the contents of memories of video controllers and input/output (I/O) devices and indicating the space required to store operating systems and basic input output systems (BIOS).

8. The data processing system of claim 1, wherein an address offset is added to said addressable storage locations to reserve lower address locations.

* * * * *